US011541553B2

(12) United States Patent
Baker et al.

(10) Patent No.: US 11,541,553 B2
(45) Date of Patent: Jan. 3, 2023

(54) SYSTEMS AND METHODS FOR PRE-PLATING STRUCTURAL MEMBERS

(71) Applicant: House of Design LLC, Nampa, ID (US)

(72) Inventors: Michael Patrick Baker, Meridian, ID (US); Cole Jay Logemann, Nampa, ID (US); Anthony Edward Lancaster, Caldwell, ID (US); Chris Scot Annin, Emmett, ID (US); Anthony Wayne Foster, Middleton, ID (US); Jeffrey Michael Hill, Meridian, ID (US); Shane Christopher Dittrich, Nampa, ID (US); Kristopher Ryan Okelberry, Nampa, ID (US)

(73) Assignee: House of Design LLC, Nampa, ID (US)

( * ) Notice: Subject to any disclaimer, the term of this patent is extended or adjusted under 35 U.S.C. 154(b) by 622 days.

(21) Appl. No.: 16/590,044

(22) Filed: Oct. 1, 2019

(65) Prior Publication Data
US 2020/0376685 A1    Dec. 3, 2020

Related U.S. Application Data

(60) Provisional application No. 62/855,179, filed on May 31, 2019.

(51) Int. Cl.
*B25J 15/06*        (2006.01)
*B25J 9/16*         (2006.01)
(Continued)

(52) U.S. Cl.
CPC ......... *B25J 15/0616* (2013.01); *B25J 9/1697* (2013.01); *B25J 15/0052* (2013.01);
(Continued)

(58) Field of Classification Search
CPC ......... B27F 7/155; B27F 7/15; B25J 15/0616; B25J 9/1697; B25J 15/0052; B65G 47/91;
(Continued)

(56) References Cited

U.S. PATENT DOCUMENTS 3,785,277 A * 1/1974 Schmitt .................. B27F 7/155
100/41
4,989,444 A * 2/1991 Murakami ............... B25J 9/042
72/422
(Continued)

FOREIGN PATENT DOCUMENTS

CN       208895556       5/2019

OTHER PUBLICATIONS

International Search Report and Written Opinion dated Jul. 28, 2020 for international application PCT/US2020/033664.
(Continued)

*Primary Examiner* — Gregory W Adams
(74) *Attorney, Agent, or Firm* — Foley & Lardner LLP

(57) ABSTRACT

Pre-plating systems and related methods are disclosed. A pre-plating system includes a press, an infeed robot configured to deliver a structural member to the press, and an outfeed robot configured to remove the structural member from the press. The press is configured to secure a plate to the structural member while the structural member is held in position by at least one of the infeed robot or the outfeed robot. A pre-plating system includes a press, a transfer pedestal, a plate picking robot, and a press loading robot. The plate picking robot is configured to pick a plate from a container and position the plate on the transfer pedestal. The press loading robot is configured to transfer the plate to the press. The press is configured to press the plate into a structural member positioned within the press.

30 Claims, 19 Drawing Sheets

(51) Int. Cl.
  *B25J 15/00*   (2006.01)
  *B27F 7/15*    (2006.01)
  *B65G 61/00*   (2006.01)
  *B65G 47/91*   (2006.01)

(52) U.S. Cl.
  CPC .............. *B27F 7/155* (2013.01); *B65G 47/91* (2013.01); *B65G 61/00* (2013.01); *G05B 2219/40006* (2013.01); *G05B 2219/40053* (2013.01)

(58) Field of Classification Search
  CPC .......... B65G 61/00; G05B 2219/40006; G05B 2219/40053; E04C 3/14; E04C 3/16; E04C 3/17
  See application file for complete search history.

(56) References Cited

U.S. PATENT DOCUMENTS

| | | | |
|---|---|---|---|
| 8,302,292 B2* | 11/2012 | McAdoo | B27F 7/155 901/50 |
| 8,478,436 B2* | 7/2013 | McAdoo | B27F 7/155 269/910 |
| 8,781,616 B2* | 7/2014 | Bourgeois | B65G 47/248 700/214 |
| 8,818,547 B2 | 8/2014 | Mcadoo et al. | |
| 9,126,350 B2 | 9/2015 | Turulin | |
| 9,662,723 B2* | 5/2017 | Yang | B23K 26/0846 |
| 9,700,062 B2* | 7/2017 | Gonus | A23C 9/16 |
| 9,713,858 B2* | 7/2017 | Yang | B23K 37/0408 |
| 2008/0172983 A1* | 7/2008 | Urmson | B27M 1/08 52/745.19 |
| 2010/0030363 A1* | 2/2010 | McAdoo | E04C 3/17 901/50 |
| 2011/0222995 A1* | 9/2011 | Irie | B25J 9/1697 700/218 |
| 2013/0042480 A1* | 2/2013 | Turulin | E04C 3/17 227/19 |
| 2018/0072517 A1* | 3/2018 | Girtman | B65G 67/24 |

OTHER PUBLICATIONS

TCT Automation , "TCT Truss Assembly System", YouTube. Mar. 10, 2009 (Mar. 10, 2009) [retrieved on Jul. 12, 2020] Retrieved from Internet: <URL:https//www.youtube.com/watch?v=o9tJeCCGAKI> entire video. See pp. 9 and 10 of the ISA.237.

* cited by examiner

SYSTEMS AND METHODS FOR PRE-PLATING STRUCTURAL MEMBERS

RELATED APPLICATIONS

This application claims the benefit under 35 U.S.C. § 119(e) of U.S. Provisional Application No. 62/855,179, entitled SYSTEMS AND METHODS FOR PRE-PLATING STRUCTURAL MEMBERS, filed May 31, 2019, which is hereby incorporated by reference herein in its entirety.

TECHNICAL FIELD

The present disclosure relates to pre-fabrication of structures and/or structural components for building structures, and more specifically to pre-plating structural members.

BACKGROUND

In constructing trusses, plates (e.g., nail plates) are used at joints between truss members to increase the strength of trusses. A plate may include teeth on a side of the plate that contacts the truss members to enable the plate to be coupled to the truss members by pressing the teeth into the truss members.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
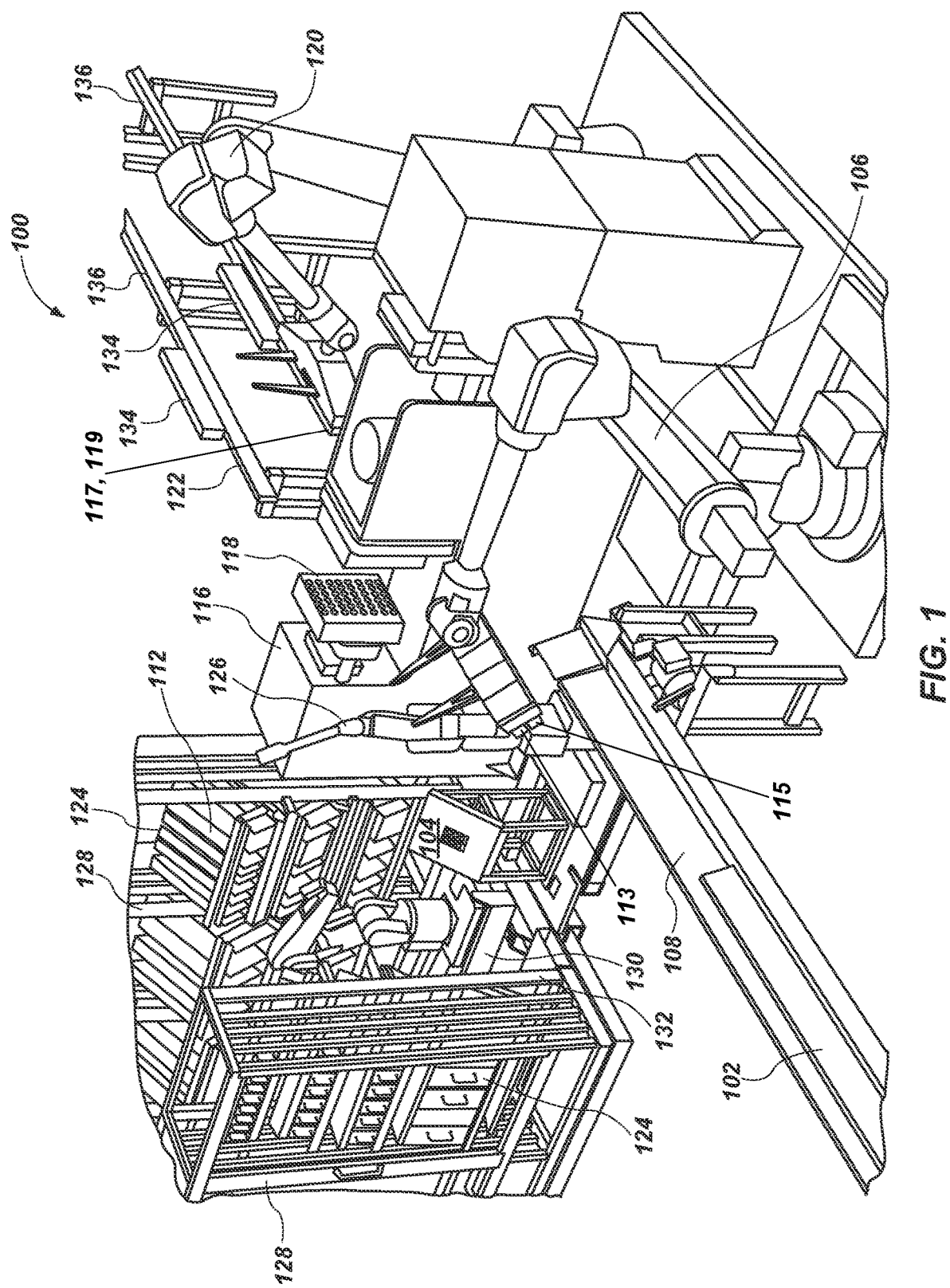
FIG. 1 is a perspective view of a pre-plating system, according to some embodiments.

In the following detailed description, reference is made to the drawings. In some instances, like reference numerals are used in the various drawings to indicate similar elements.

As used herein, the term "plate" refers to a plate to be used at a joint between structural members. In some instances, a "plate" includes teeth for pressing into structural members and/or nail holes to enable nails to be driven through the plate to secure the plate to the structural member.

As used herein, the term "structural member" refers to a member to be used to construct a structure such as a building or other structure. For example, a structural member may be used to construct a truss, which in turn may serve in construction of homes, other buildings, bridges, or other structures. In such examples, a structural member may include a truss member.

Embodiments disclosed herein relate to pre-plating structural members (e.g., boards) to be used in constructing structures such as homes or other buildings. Although embodiments disclosed herein find particular utility in pre-plating truss members to be used in constructing trusses, it will be apparent to those of ordinary skill in the art that embodiments of the present disclosure encompass pre-plating of any structural members that are intended for use in constructing any type of structure.

FIG. 1 is a perspective view of a pre-plating system 100, according to some embodiments. The pre-plating system 100 includes a plate picking robot 110, a transfer pedestal 114, a press loading robot 126, a press 116, an infeed delivery system 108, an infeed robot 106, an outfeed robot 120, and an outfeed delivery system 122. The plate picking robot 110 is configured to pick, from one of a plurality of containers 124, a plate 112 to be used at a joint between two or more truss members. The containers 124 are configured to store the plates 112. The plate picking robot 110 is configured to place the plate 112 on the transfer pedestal 114. The press loading robot 126 is configured to transfer the plate 112 from the transfer pedestal 114 to a press surface 118 of the press 116. The infeed delivery system 108 is configured to deliver a structural member 102 to the infeed robot 106. The infeed robot 106 is configured to deliver the structural member 102 to the press 116. The outfeed robot 120 is configured to remove the structural member 102 from the press 116. The press 116 is configured to secure the plate to the structural member 102 (e.g., by pressing teeth of the plate into the structural member 102) while the structural member 102 is held in position by either the infeed robot 106 or the outfeed robot 120.

The infeed robot 106 and the outfeed robot 120 are configured to position the structural member 102 within the press 116 based on a determined centroid of the structural member. The infeed robot 106 and the outfeed robot 120 can position the structural member 102 within the press 116 without the use of an indicia provided on or in the structural member. As used herein, the term "centroid" refers to an average position of points in space defining a structural member. In some embodiments, the centroid is determined based on a major plane of a truss member (e.g., an estimate of the average position of the points making up the major plane). A location of the centroid of the structural member 102 may be determined by various methods. For example, it may be known that the structural member 102 has a certain predetermined geometry (e.g., a 2×4, a 2×12, etc.), and that the infeed delivery system 108 will deliver the structural member 102 to a known position and orientation. As a specific example, the structural member 102 may have a known geometry, and the infeed delivery system 108 may be configured to convey a leading edge of the structural member 102 to a pre-determined location, allowing the infeed robot 106 to estimate the location of the centroid relative to itself based on the known geometry and the known position of the leading edge. As another example, image sensors may be used to determine locations of edges and/or corners of the structural member 102, and an estimate of the centroid may be determined based on the determined locations of the edges and/or corners. A further example of determining the location of the centroid includes the use of weight and/or mass measuring devices. Assuming that the truss member is approximately uniformly dense, the centroid may be determined by locating the center of mass of the structural member 102.

In some embodiments, one or more of the infeed robot 106, the outfeed robot 120, the plate picking robot 110, or the press loading robot 126 may include robot arm assemblies having securing mechanisms at their ends and one or more joints. The securing mechanisms at the ends of the infeed robot 106 and the outfeed robot 120 are configured to secure the structural member 102. By way of non-limiting example, the securing mechanisms at the ends of the infeed robot 106 and the outfeed robot 120 may include a suction mechanism 113, 117 (e.g., a vacuum system) configured to secure the structural member 102 thereto using suction. Also by way of non-limiting example, the securing mechanisms at the ends of the infeed robot 106 and the outfeed robot 120 may include a gripping mechanism 115, 119 (e.g., a claw) to grip the structural member 102. As a further non-limiting example, the securing mechanisms at the ends of the infeed robot 106 and the outfeed robot 120 may include puncturing mechanisms configured to pierce the structural member 102. In some embodiments the infeed robot 106 and the outfeed robot 120 may include both a suction mechanism and a gripping mechanism at the end thereof. In some such embodiments the suction mechanism may be used to secure structural members that are longer than a predetermined threshold length (e.g., four feet), and the gripping mechanism may be used to grip structural members that are shorter than the predetermined threshold length.

The securing mechanisms at the ends of the plate picking robot 110 and the press loading robot 126 are configured to secure the plates 112. By way of non-limiting example, the securing mechanisms at the ends of the plate picking robot 110 and the press loading robot 126 may include a magnet 123, 121 (e.g., a passive magnet and/or an electromagnet) to secure plates 112 including magnetically attractive materials (e.g., iron, nickel, etc.). Magnets may also be used at the transfer pedestal 114 and/or the press 116 to secure the plates thereto. In instances where handoffs of the plate between devices having passive magnets occur, a device handing off the plate to a subsequent device may roll away from the plate rather than back straight off the plate to facilitate detachment from the plate without interrupting the coupling between the plate and the subsequent device. Another approach may be to use weaker magnets in devices than stronger magnets used in subsequent device (e.g., magnets of the plate picking robot 110, the transfer pedestal 114, the press loading robot 126, and the press 116 have successively stronger magnets to facilitate handoffs between devices). In instances where electromagnets are used, the electromagnets may be controlled to facilitate handoffs between the various devices. For example, the plate picking robot 110 may maintain current flowing through an electromagnet at the end thereof to secure the plate to the end of the plate picking robot 110, then interrupt the current flowing therethrough while initiating a current to an electromagnet of the transfer pedestal 114. Also by way of non-limiting example, the securing mechanisms at the ends of the plate picking robot 110 and the press loading robot 126 may include gripping members to grip the plates 112.

In some embodiments the securing mechanisms at the ends of the plate picking robot 110 and the press loading robot 126 may include a gripping mechanism. For example, the plate picking robot 110 and/or the press loading robot 126 may include a universal gripping mechanism similar to that discussed below with reference to FIGS. 16-19D. This universal gripping mechanism is configured to grip the plate regardless of the pattern of teeth/holes on the plate, as will be discussed in more detail below.

The one or more joints of the infeed robot 106, the outfeed robot 120, the plate picking robot 110, and the press loading robot 126 are configured to enable the infeed robot 106, the outfeed robot 120, the plate picking robot 110, and the press loading robot 126 with motion capabilities (e.g., translational motion, rotary motion). These joints may include linear joints, orthogonal joints, rotational joints, twisting joints, revolving joints, or combinations thereof. In the embodiment illustrated in FIG. 1 the plate picking robot 110 is mounted on a trolley 130 that traverses a track 132 that extends between multi-tiered container racks 128 loaded with containers 124 filled with plates 112 of various shapes and/or sizes. The containers 124 are located within reach of the plate picking robot 110 to enable the plate picking robot 110 to retrieve plates 112 from the containers 124. The joints of the plate picking robot 110 enable the plate picking robot 110 to reach plates 112 located within any of the containers 124. The plates 112 may be organized into specific locations within the container racks 128 and containers 124 so that the plate picking robot 110 can traverse the track to the location of a certain one of the containers 124 and pick the proper plate therefrom. The plate picking robot 110 then, if needed, traverses the track 132 to within reach of the transfer pedestal 114 and places the plate on the transfer pedestal 114. The plates 112 may be organized by size and/or shape within the containers 124 so that the plate picking robot 110 can retrieve a plate of a desired shape and/or size from a known location.

In some embodiments the plate picking robot 110 is configured to rotate a retrieved plate to a desired orientation before placing the plate on the transfer pedestal 114. Accordingly, it may be desirable to secure the plate with the securing mechanism at the end of the plate picking robot 110 at a center of the plate to enable balanced rotation of the plate. A center of the plate may be located based on known geometries of the plate and the containers 124 that hold the plates 112, and known positions of the containers 124 relative to the plate picking robot 110. With the plate placed on the transfer pedestal 114 at a desired angle, the press loading robot 126 can transfer the plate from the transfer pedestal 114 to the press 116 without undue rotation. It should be noted that in some embodiments the transfer pedestal 114 may be used to rotate the plate to the desired angle instead of, or in addition to, the plate picking robot 110.

The joints of the press loading robot 126 enable the securing mechanism at the end of the press loading robot 126 to extend between the transfer pedestal 114 and the press surface 118 of the press 116.

The joints of the infeed robot 106 enable the securing mechanism at the end of the infeed robot 106 to extend between the infeed delivery system 108 and the press 116. These joints may also enable the infeed robot 106 to position the structural member 102 in various different positions within the press 116 to enable plates 112 to be applied to various locations on the structural member 102.

Similarly, the joints of the outfeed robot 120 enable the securing mechanism at the end of the outfeed robot 120 to extend between the press 116 and the outfeed delivery system 122. These joints may also enable the outfeed robot 120 to position the structural member 102 in various different positions within the press 116 to enable plates 112 to be applied to various locations on the structural member 102.

The press 116 may include an electrically controllable press. As previously discussed, in some embodiments the press 116 may include a magnet (e.g., an electromagnet configured to selectively secure a plate to the press surface 118) in a position and orientation in which the press loading robot 126 delivered the plate thereto). The press 116 is configured to apply sufficient force to a plate mounted thereto to press the plate into the structural member 102.

In some embodiments the transfer pedestal 114 includes a working surface 104. In the embodiment illustrated in FIG. 1, the working surface 104 of the transfer pedestal 114 is at a slant rather than being oriented horizontally. The working surface 104, however, may have any orientation including horizontal, vertical, or any non-horizontal and/or non-vertical slopes. In some embodiments, the transfer pedestal 114 may include a magnet (e.g., an electromagnet that is selectively controllable) to enable a plate to be secured thereto. As previously discussed, orientation of the plate in anticipation of placing the plate at a particular orientation on the structural member 102 may be performed at least in part by orienting the plate in a specific way, by the plate picking robot 110, on the working surface 104 of the transfer pedestal 114.

In some embodiments the infeed delivery system 108 may include a conveyer system, such as that illustrated in FIG. 1. In some embodiments, the conveyer system may be tilted at a non-horizontal slope to present the structural member 102 to the infeed robot 106 in a convenient orientation for the infeed robot 106 to secure the structural member 102. In other words, it may be convenient for the infeed robot 106 to secure the structural member 102 if it approaches the infeed robot 106 at a non-horizontal angle. In some embodiments, however, the conveyer system may be oriented horizontally.

In some embodiments the outfeed delivery system 122 includes one or more trolleys 134 that traverse one or more tracks 136. The trolleys 134 may be configured to secure the pre-plated structural member 102 thereto and move along the tracks 136 to carry the structural member 102 away from the pre-plating system 100. By way of non-limiting example, the trolleys 134 may include electromagnets configured to secure to one or more metal plates pressed into the structural member 102. Also by way of non-limiting example, the trolleys 134 may include suction mechanisms to enable the trolleys 134 to secure to the structural member 102 using suction. In some embodiments the outfeed delivery system 122 is configured to deliver the structural member 102 to a truss assembly system (e.g., an automatic truss assembly systems) where the structural member 102 will be used along with other truss members to build a truss.

The structural member 102 may in some embodiments include a truss member. In some embodiments, the structural member 102 may include a wooden board, a metal member, or a member of another material that is suitable for structural support of a building.

Figure 2:
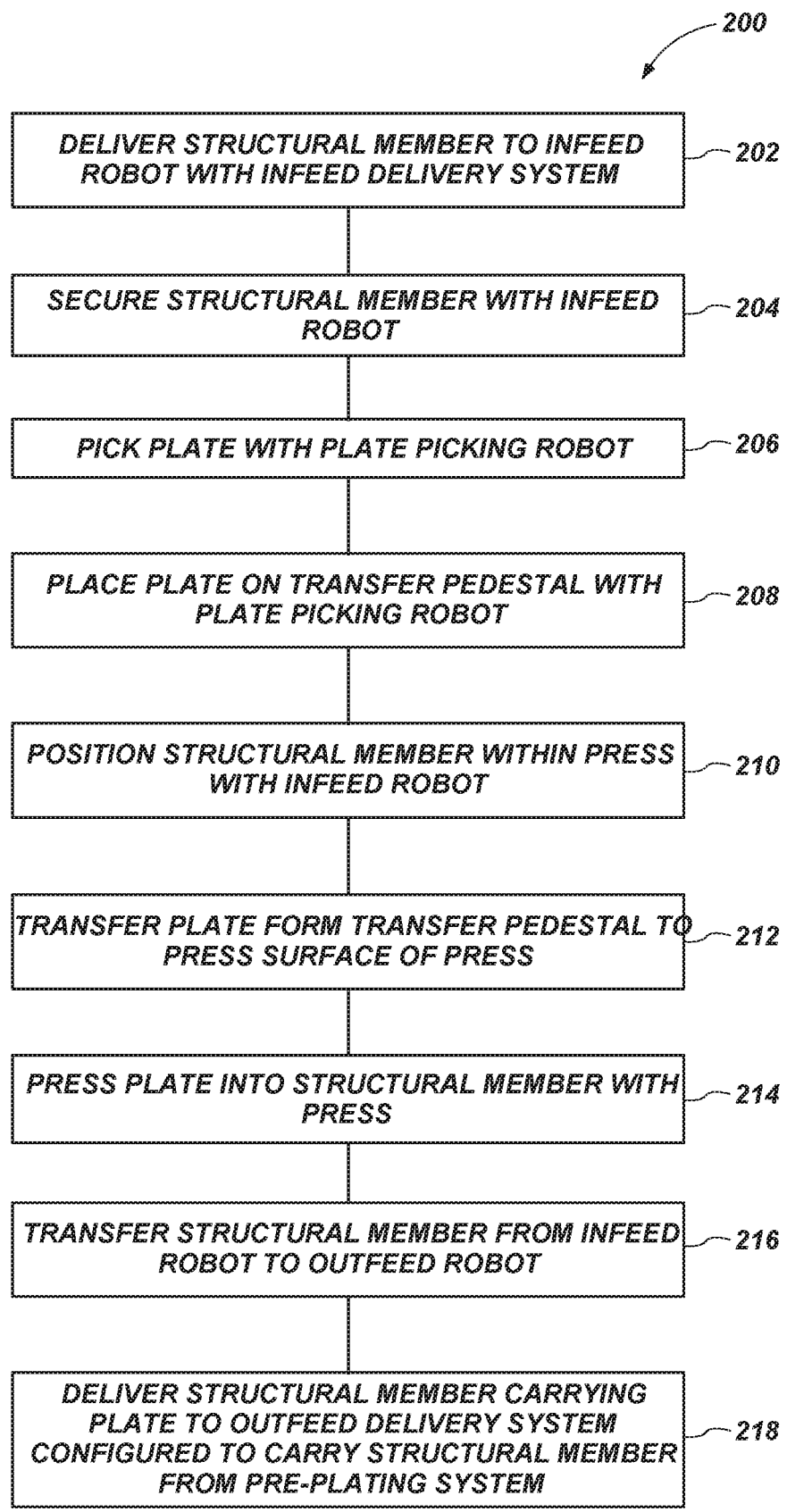
FIG. 2 is a flowchart illustrating a method of operating the pre-plating system, according to some embodiments.
Figure 5:
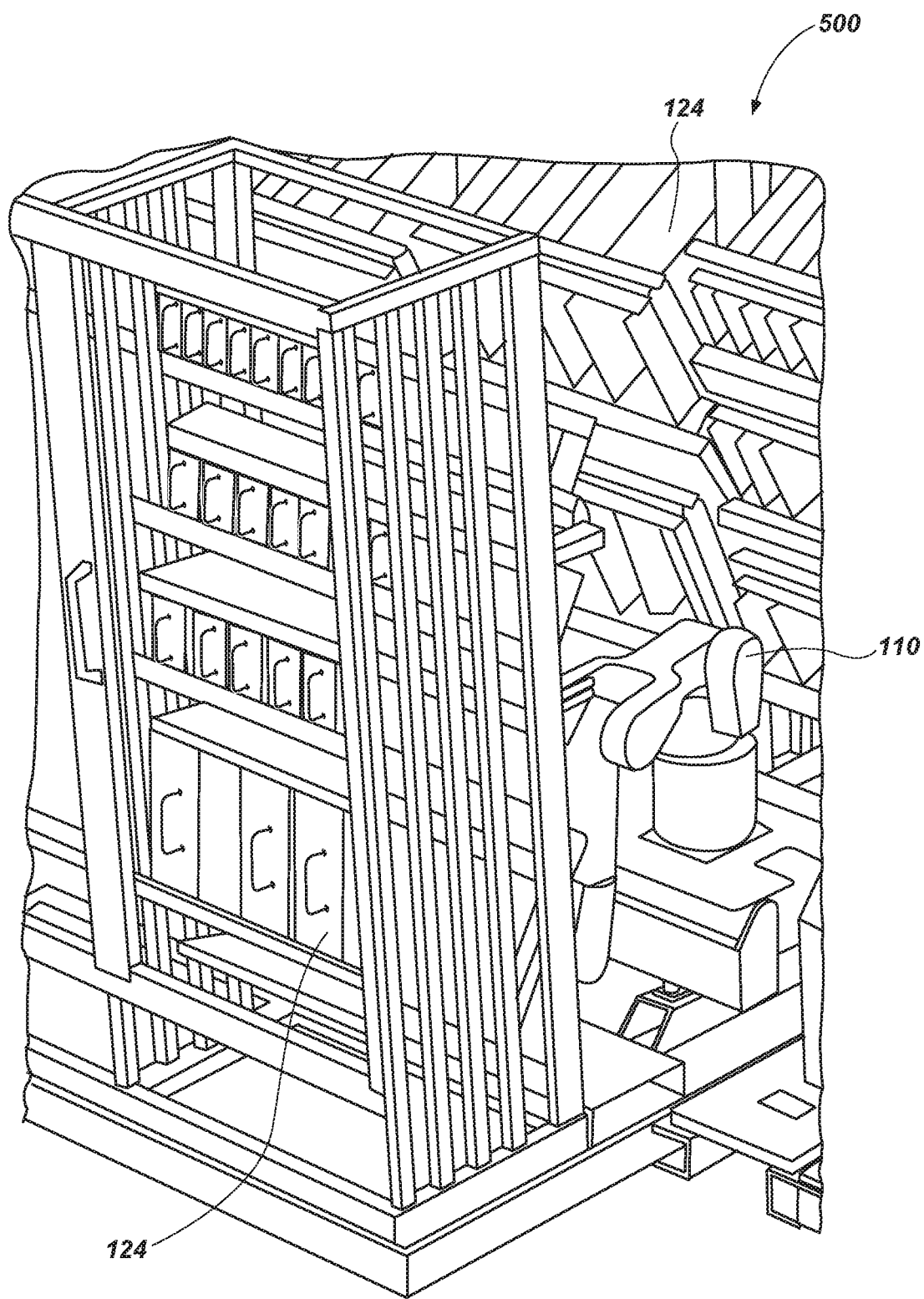
FIG. 5 is a perspective view of a portion of the pre-plating system picking a plate.
Figure 6:
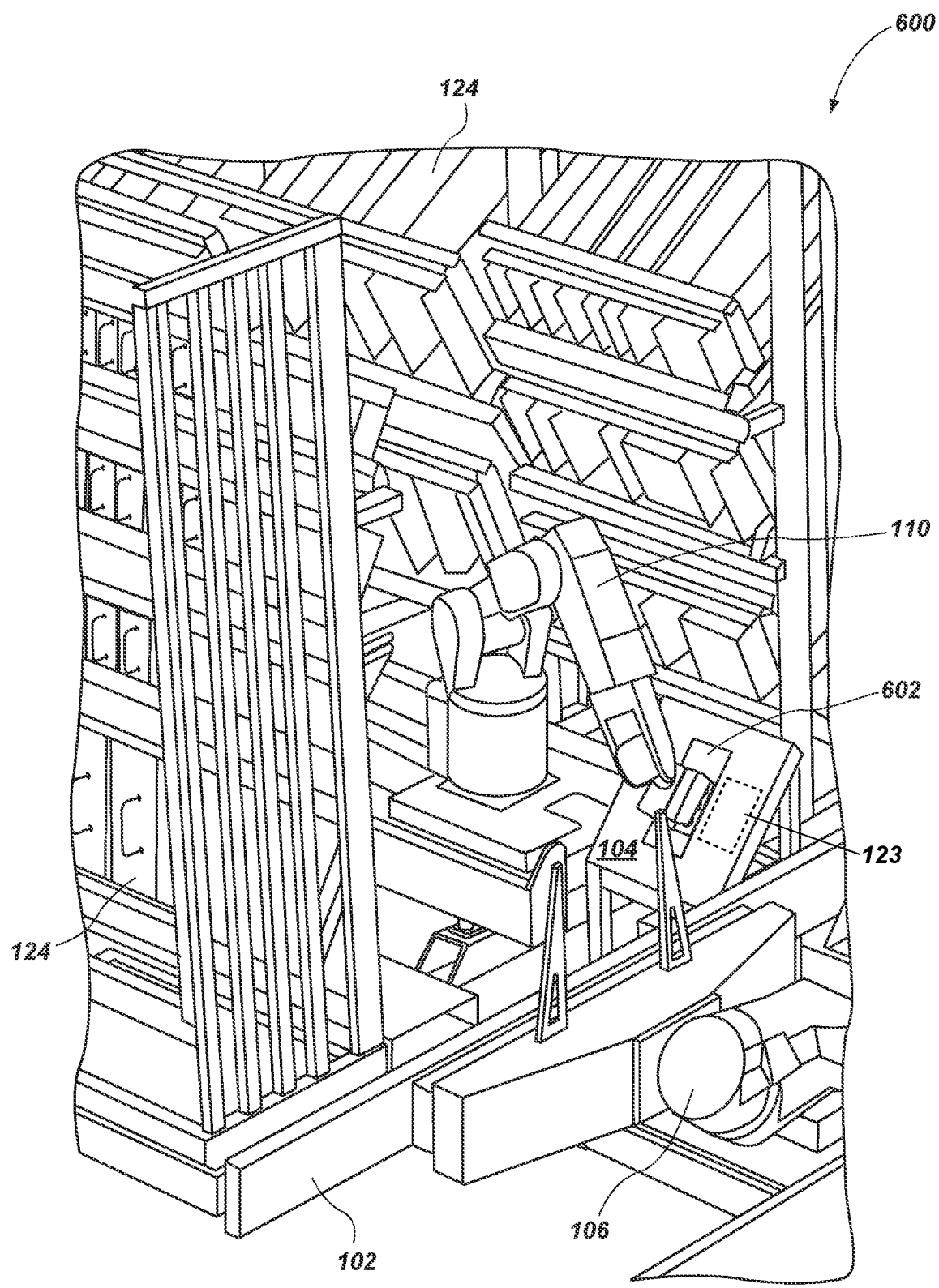
FIG. 6 is a perspective view of a portion of the pre-plating system placing a plate on a transfer pedestal.

FIG. 2 is a flowchart illustrating a method 200 of operating the pre-plating system 100 of FIG. 1, according to some embodiments. FIGS. 3, 4, and 7-14 are perspective views of the pre-plating system 100 of FIG. 1, illustrating various acts 202, 204, and 210-218 of the method 200 of FIG. 2. FIGS. 5 and 6 are perspective views of portions 500, 600, respectively, of the pre-plating system 100 of FIG. 2, illustrating acts 206, 208 of the method 200 of FIG. 2.

Figure 3:
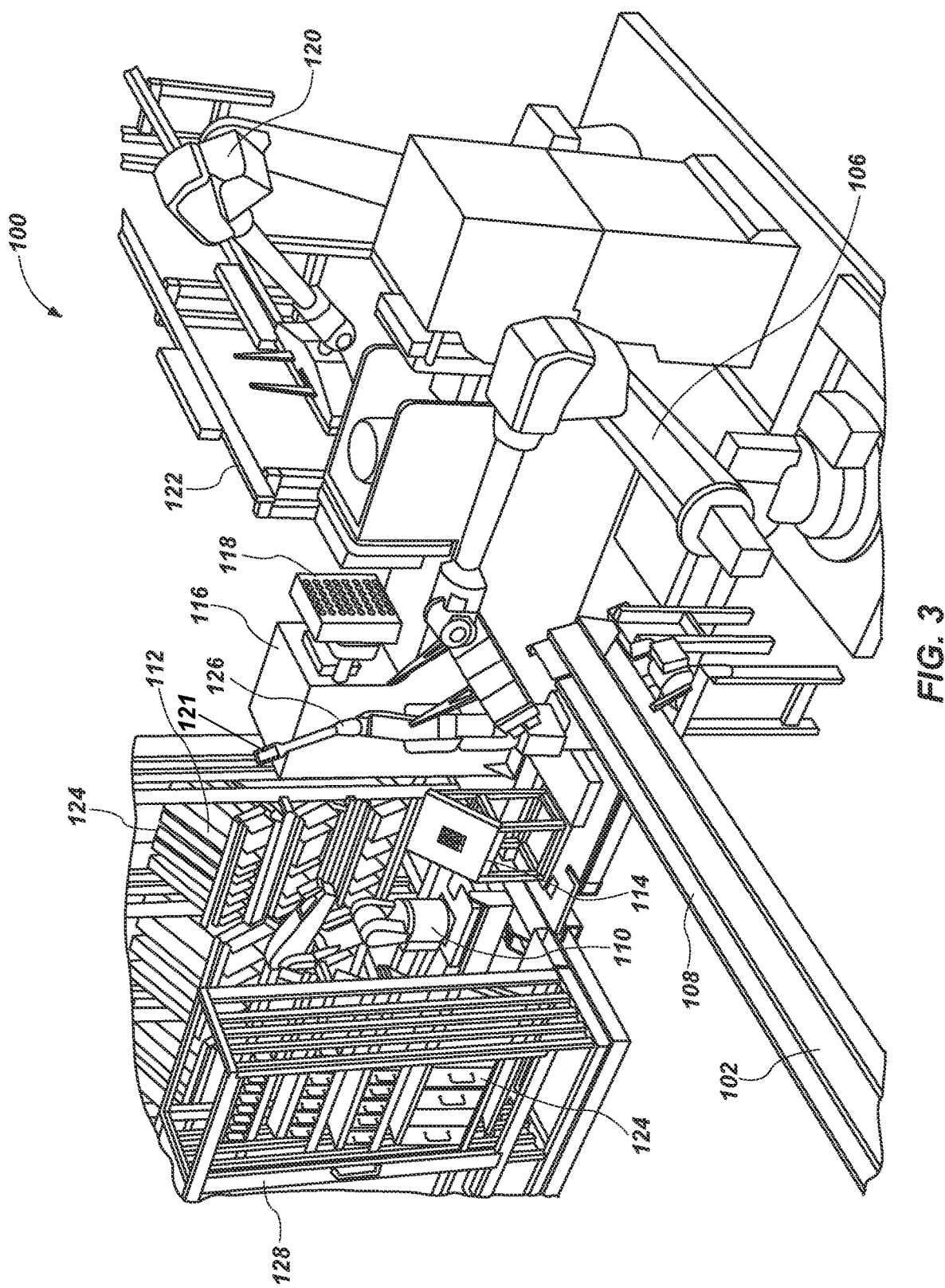
FIG. 3 is a perspective view of the pre-plating system delivering a structural member to an infeed robot.

Referring to FIGS. 2 and 3 together, the method 200 includes delivering 202 the structural member 102 to the infeed robot 106 with the infeed delivery system 108. In some embodiments delivering 202 the structural member 102 to the infeed robot 106 includes conveying the structural member 102 to the infeed robot 106 using a conveyer system. In some embodiments delivering 202 the structural member 102 to the infeed robot 106 includes delivering the structural member 102 to the infeed robot 106 with a major plane of the structural member 102 oriented in a tilted, non-horizontal angle to enable the infeed robot 106 to conveniently secure the structural member 102.

Figure 4:
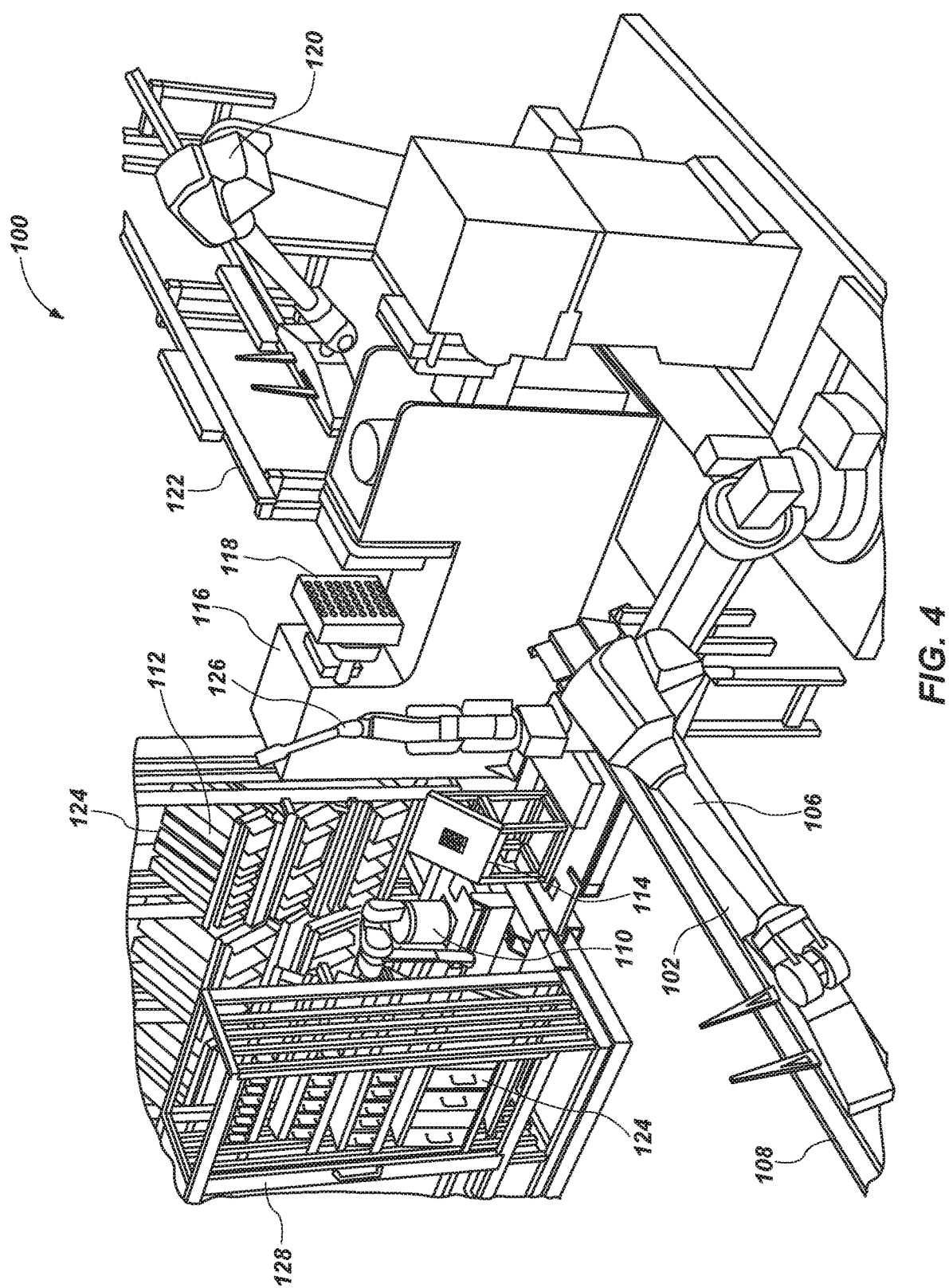
FIG. 4 is a perspective view of the pre-plating securing a truss member with the infeed robot.

Referring now to FIGS. 2 and 4, the method 200 also includes securing 204 the structural member 102 with the infeed robot 106. FIG. 4 illustrates the infeed robot 106 securing 204 the structural member 102 with the securing mechanism at the end of the infeed robot 106. In some embodiments, securing the structural member 102 with the infeed robot 106 includes suctioning the structural member to the infeed robot 106 with a vacuum system. In some embodiments, securing the structural member 102 to the infeed robot 106 includes gripping the structural member 102 with a gripping member at the end of the infeed robot 106.

FIG. 5 is a perspective view of a portion 500 of the pre-plating system 100 of FIG. 1. Referring to FIGS. 2 and 5 together, the method 200 further includes picking 206 a plate from one of the containers 124 with the plate picking robot 110. FIG. 5 shows the plate picking robot 110 picking 206 a plate from one of the containers 124. In some embodiments, picking 206 a plate includes securing a center of the plate to an end of the plate picking robot 110. In some embodiments, picking 206 a plate includes securing the plate to the end of the plate picking robot 110 with a gripping mechanism. In some embodiments, picking 206 a plate includes securing the plate to the end of the plate picking robot 110 with a magnet (e.g., a passive magnet, an electromagnet, or both).

FIG. 6 is a perspective view of a portion 600 of the pre-plating system 100 of FIG. 1. Referring now to FIGS. 2 and 6 together, the method 200 also includes placing 208 a plate 602 on the transfer pedestal 114 with the plate picking robot 110. FIG. 6 shows the plate picking robot 110 placing 208 the plate 602 on a working surface 104 of the transfer pedestal 114. In some embodiments, placing 208 a plate 602 on the transfer pedestal 114 comprises rotating the plate 602 to a desired orientation using the plate picking robot 110 and placing the plate 602 on the transfer pedestal 114 in the desired orientation.

Figure 7:
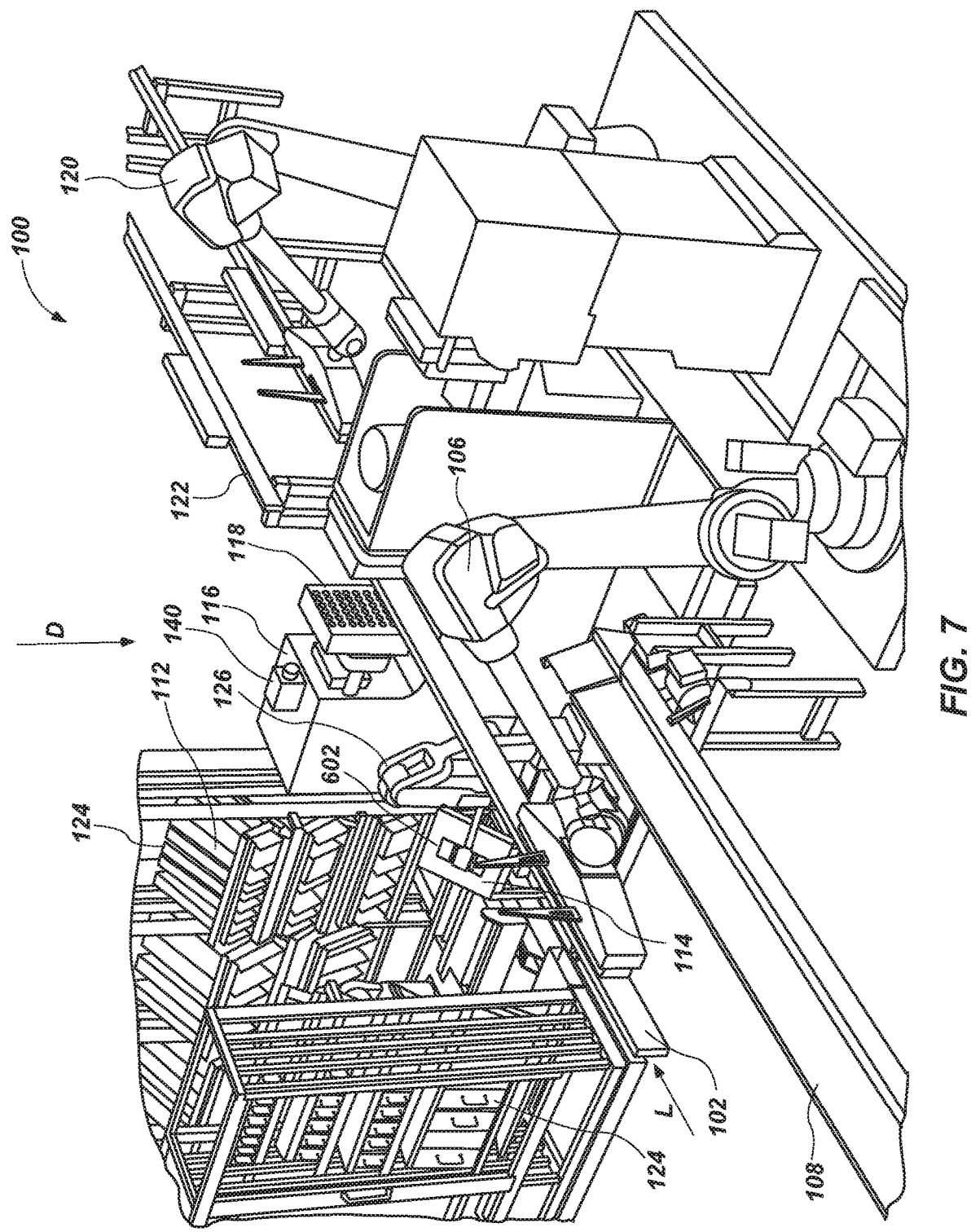
FIG. 7 is a perspective view of the pre-plating system positioning a structural member within a press.

Referring now to FIGS. 2 and 7, the method 200 further includes positioning 210 the structural member 102 within the press 116 with the infeed robot 106. FIG. 7 illustrates the infeed robot 106 positioning 210 the structural member 102 within the press 116. In some embodiments, positioning 210 the structural member 102 within the press 116 includes positioning the structural member 102 within the press 116 based on a determined centroid of the structural member 102. In some embodiments, positioning 210 the structural member 102 within the press 116 includes positioning the structural member within the press 116 without the use of an indicia provided on or in the structural member 102.

In some embodiments, the positioning 210 of the structural member 102 within the press 116 may be accomplished by approaching the press from above and gradually lowering the structural member 102 downward into the press 116 to be engaged by the press surface. Stated otherwise, the structural member 102 can be lowered in a downward direction D (indicated in FIG. 7 by arrow D) that is transverse to the length of the structural member 102 as shown in FIG. 7 and toward the floor.

In some embodiments, a vision system 140 may scan the structural member 102 at positioning 210 into the press 116. For example, the vision system 140 may scan the structural member 102 as it is lowered in the downward direction D (or otherwise inserted or placed) into the press 116. As another example, the infeed robot 106 may bring the structural member 102 to a fixed position in front of the vision system 140 for scanning prior to placement of the structural member 102 into the press 116. The vision system 140 can identify a bottom or lowest edge of the structural member 102, which can be used as a reference for appropriately positioning the structural member 102 in the press 116. The vision system 140 can identify a bottom edge of the structural member 102 and detect droop or sag in the robotic arm and/or inject the location of the bottom edge as an input into the infeed robot 106 (and/or the outfeed robot 120 to enhance or otherwise improve preciseness of positioning of the structural member 102 in the press 116. A backdrop may also be provided in the field of view of the vision system 140 and behind the structural member 102 to facilitate capture of image data by the vision system 140.

In other embodiments, the positioning 210 of the structural member 102 within the press 116 may be accomplished by approaching the press from a side or in a lateral direction L (indicated in FIG. 7 by arrow L). In still other embodiment, insertion of the structural member 102 into the press 116 may be approached from another direction, such as a combination of a lateral direction L and a downward direction D.

Figure 8:
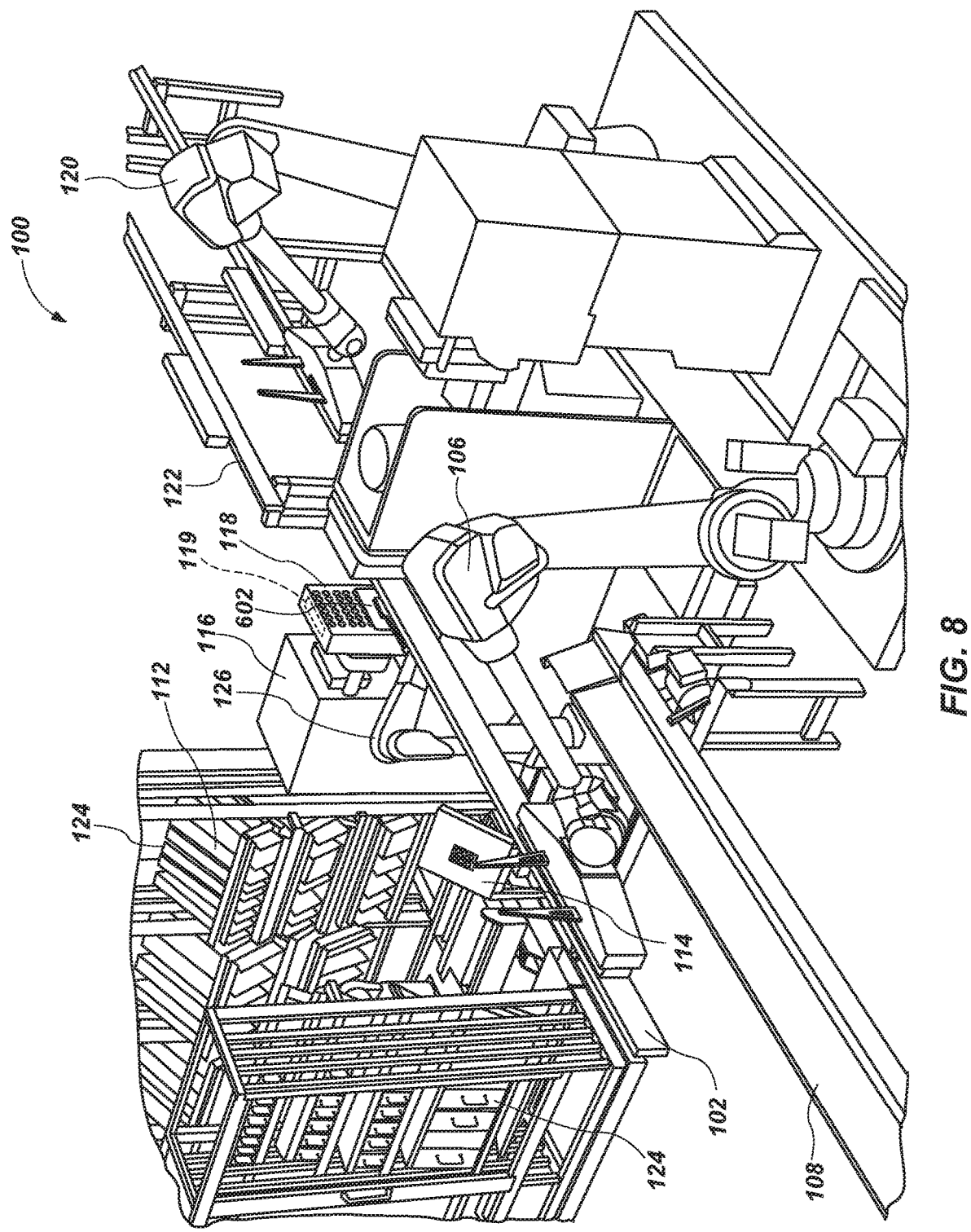
FIG. 8 is a perspective view of the pre-plating system transferring a plate to the press.

Referring now to FIGS. 2 and 8 together, the method 200 includes transferring 212 the plate 602 from the transfer pedestal 114 to a press surface 118 of the press 116. FIG. 8 illustrates the press loading robot 126 placing the plate 602 on the press surface 118 of the press 116. In some embodiments, transferring 212 the plate 602 from the transfer pedestal 114 to a press surface 118 of the press 116 includes securing the plate 602 on the press surface 118 while at least one of the infeed robot 106 or the outfeed robot 120 positions the structural member 102 within the press 116. In some embodiments, transferring 212 the plate 602 from the transfer pedestal 114 to a press surface 118 of the press 116 includes securing the plate on the press surface 118 using a securement mechanism 119, such as a magnet (e.g., a passive magnet, an electromagnet, or both), a vacuum, a mechanical gripper, or the like. The securement mechanism 119 may be internal to and/or otherwise integrated with the press surface 118 of the press 116.

Figure 9:
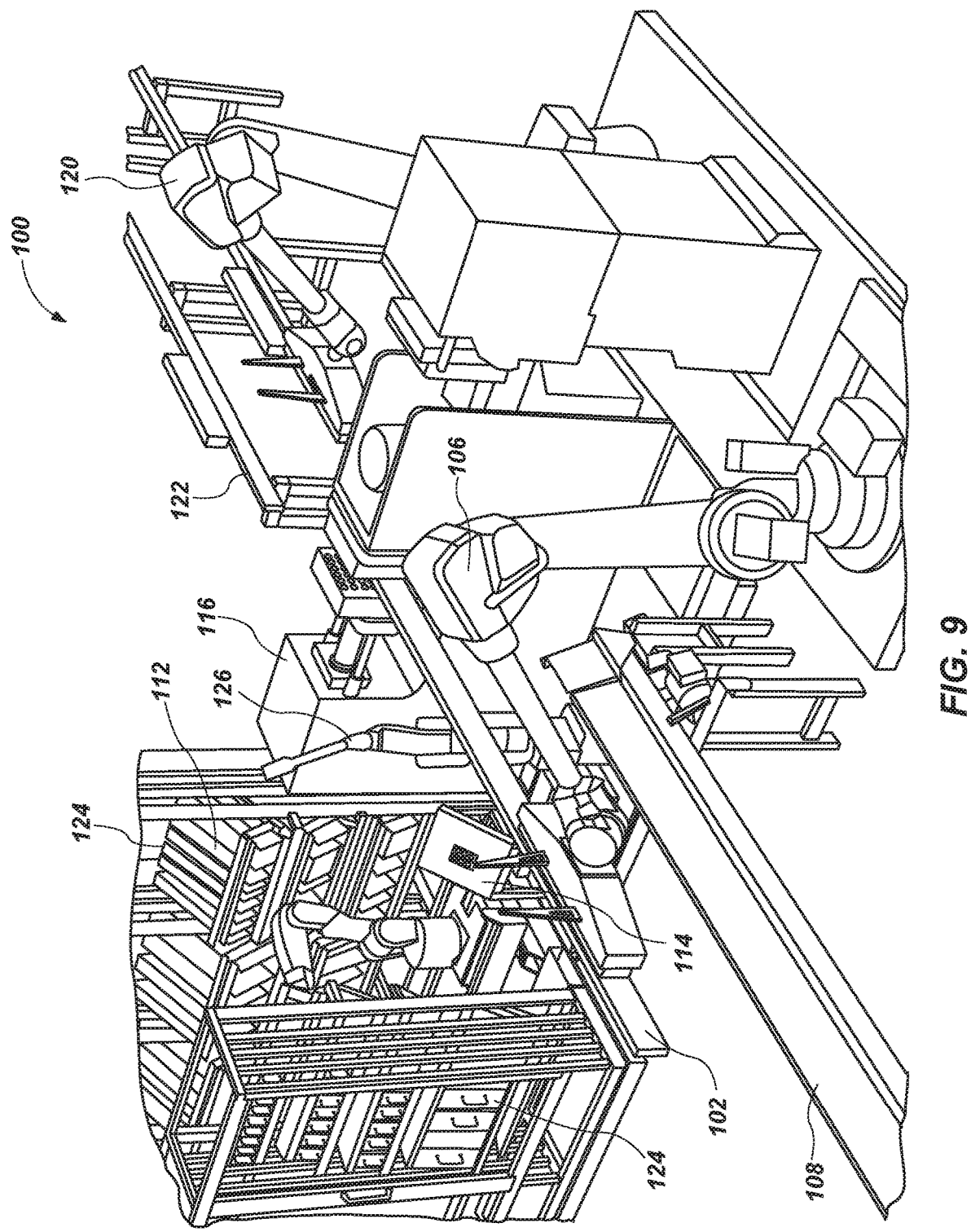
FIG. 9 is a perspective view of the pre-plating system pressing the plate into the structural member.

Referring to FIGS. 2 and 9, the method 200 includes pressing 214 the plate 602 into the structural member 102 with the press 116. FIG. 9 illustrates the press 116 pressing 214 the plate 602 into the structural member 102.

Figure 10:
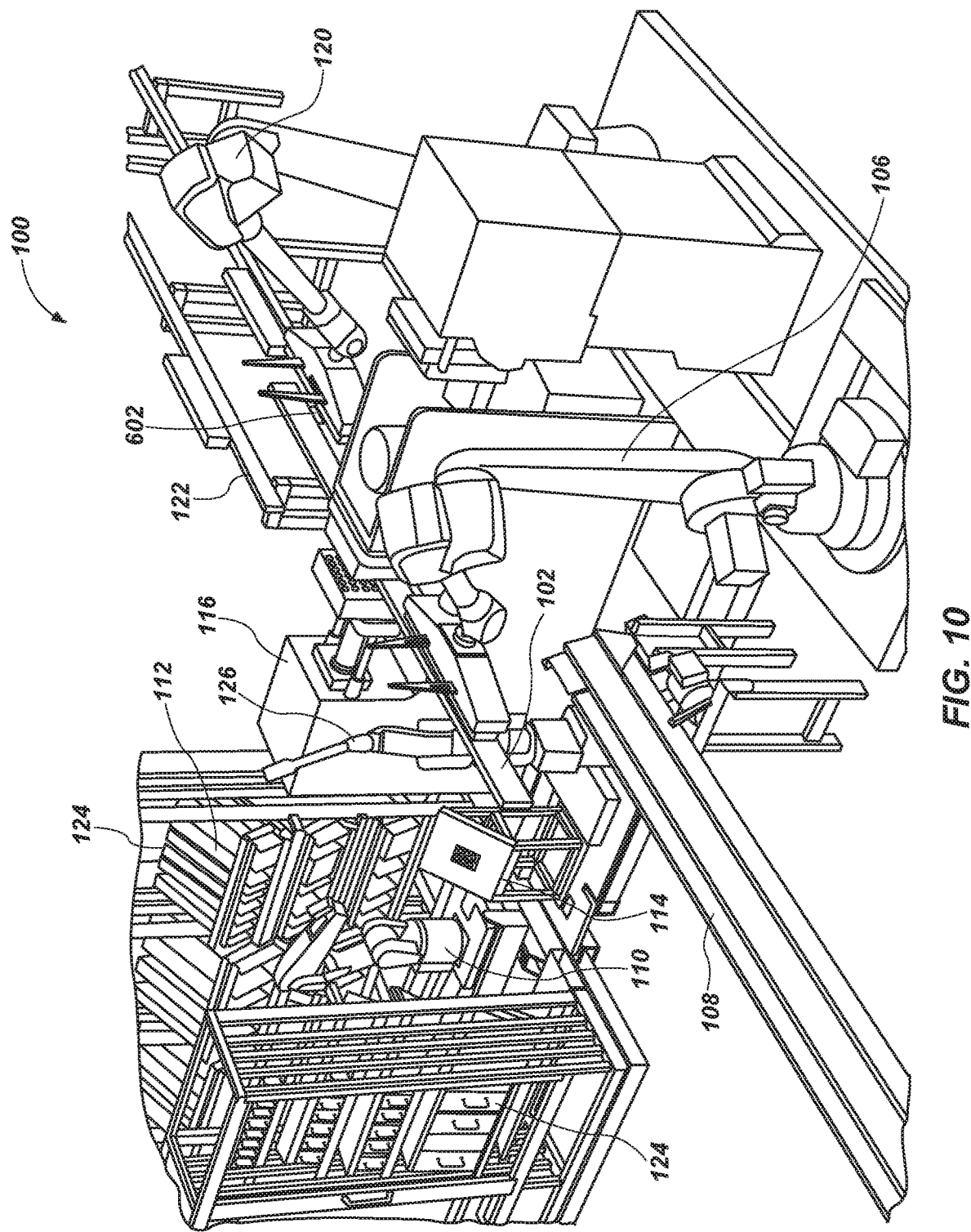
FIG. 10 is a perspective view of the pre-plating system pressing another plate into the structural member at a different location from the plate.

Referring now to FIGS. 2 and 10 together, in some embodiments, positioning 210 and pressing 214 comprises repositioning the structural member 102 within the press 116 and pressing another plate into the structural member 102 at a different location than that of the plate 602. FIG. 10 illustrates the infeed robot 106 holding the structural member 102 in another position and the press 116 pressing another plate into the structural member 102 at a different location from that of the plate 602.

Figure 11:
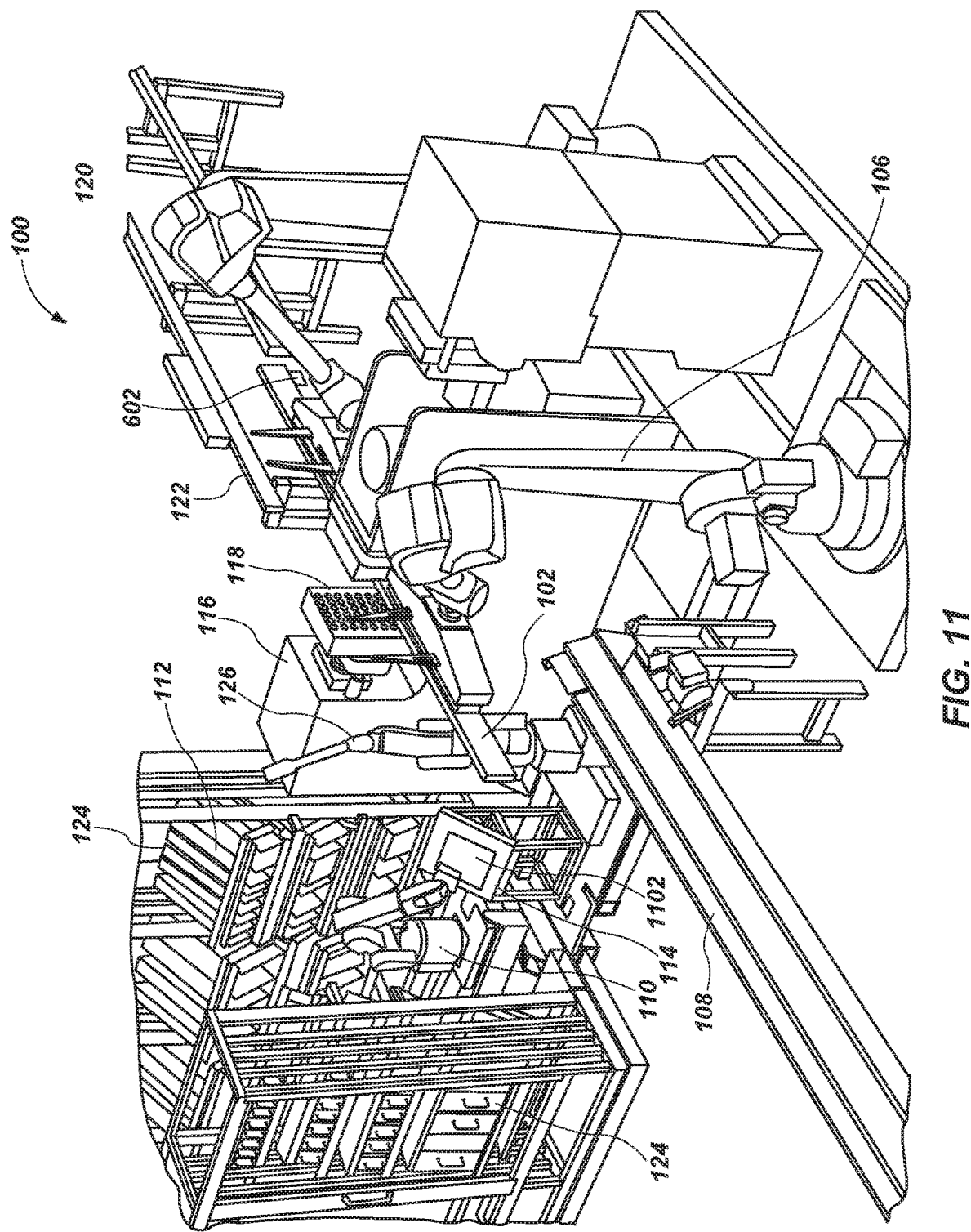
FIG. 11 is a perspective view of the pre-plating system transferring the structural member to an outfeed robot.

Referring to FIGS. 2 and 11 together, the method 200 also includes transferring 216 the structural member 102 from the infeed robot 106 to an outfeed robot 120. FIG. 11 illustrates the infeed robot 106 handing off the structural member 102 to the outfeed robot 120. In some embodiments there may be a sequence in which the press 116 holds the structural member 102 while the infeed robot 106 and/or the outfeed robot 120 exchange or sequentially secure the structural member 102 (e.g., the infeed robot 106 may release the structural member 102 while the press 116 holds the structural member 102 and the outfeed robot 120 may secure the structural member 102 before the press 116 releases the structural member 102.

FIG. 11 also illustrates the plate picking robot 110 placing another plate 1102 on the transfer pedestal 114. The other plate 1102 is transferred from the transfer pedestal 114 to the press surface 118 of the press 116, as discussed above with reference to FIG. 8 and transferring 212.

Figure 12:
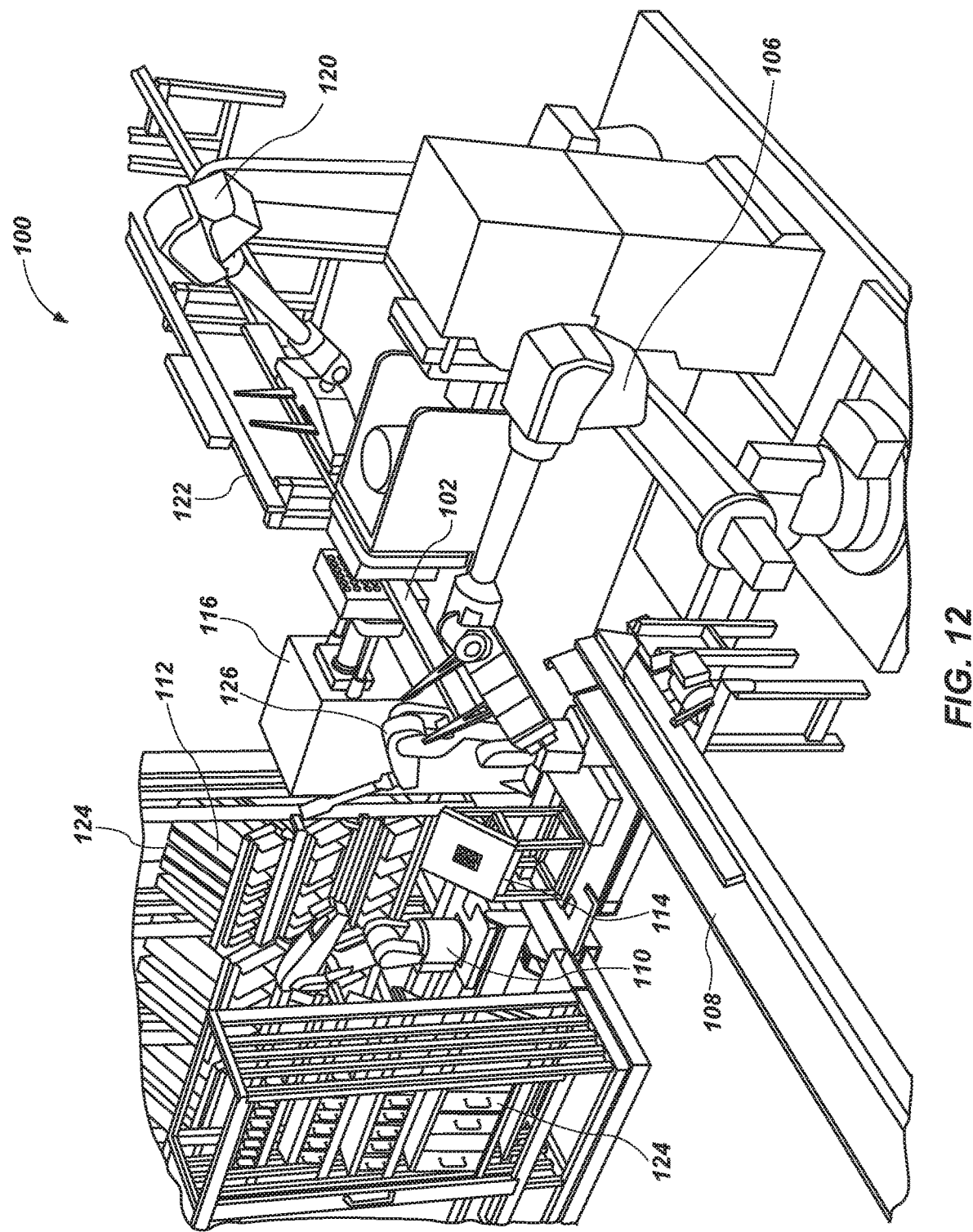
FIG. 12 is a perspective view of the pre-plating system repositioning the structural member within the press using the outfeed robot.

FIG. 12 illustrates the outfeed robot 120 positioning the structural member 102 within the press 116 while the press 116 presses the other plate 1102 into the structural member 102.

Figure 13:
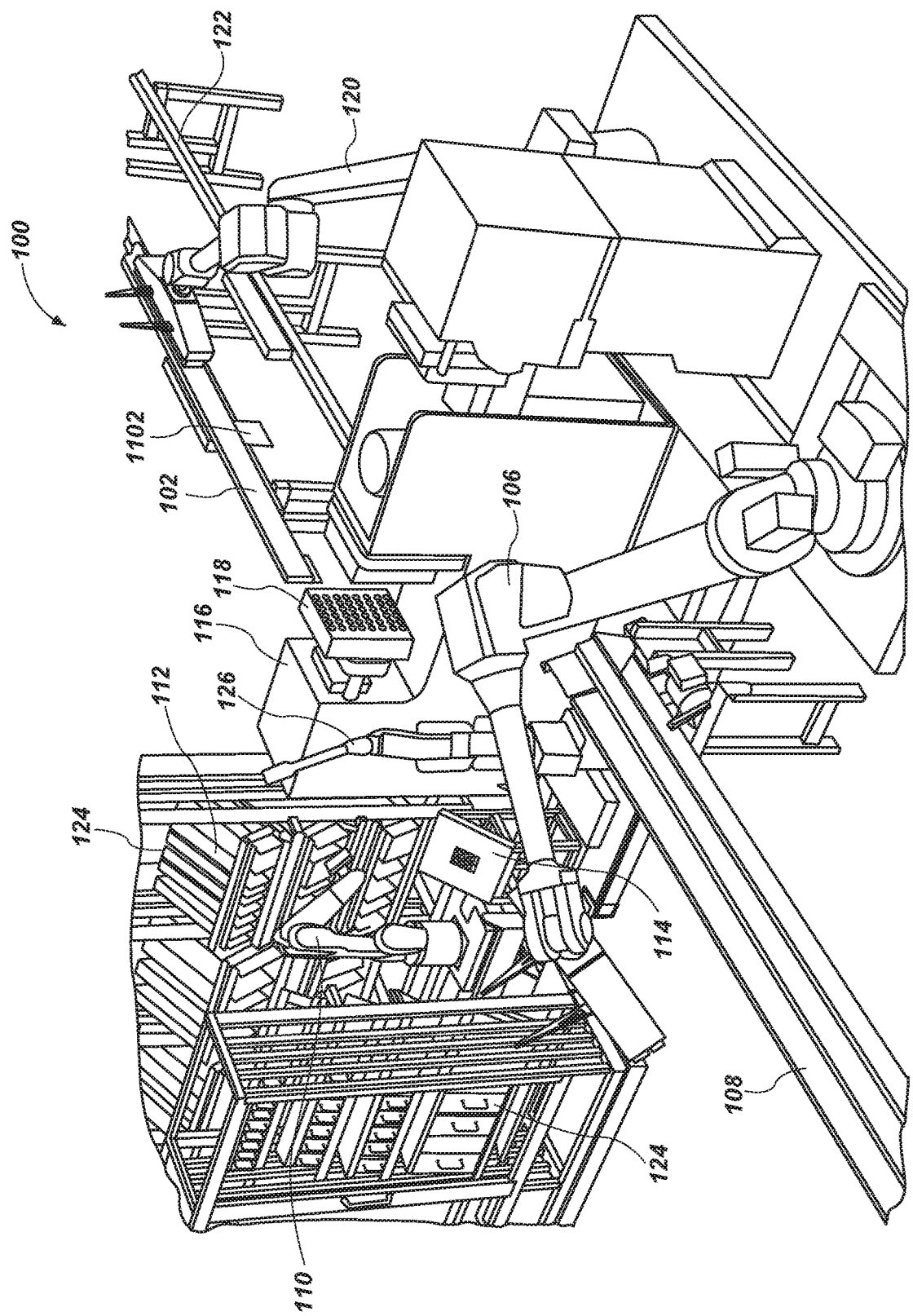
FIG. 13 is a perspective view of the pre-plating system delivering the truss member to an outfeed delivery system.

Referring now to FIGS. 2 and 13, the method 200 further includes delivering 218 the structural member 102 carrying the plate 602 and the other plate 1102 to an outfeed delivery system 122 configured to carry the structural member 102 from the pre-plating system 100.

Figure 14:
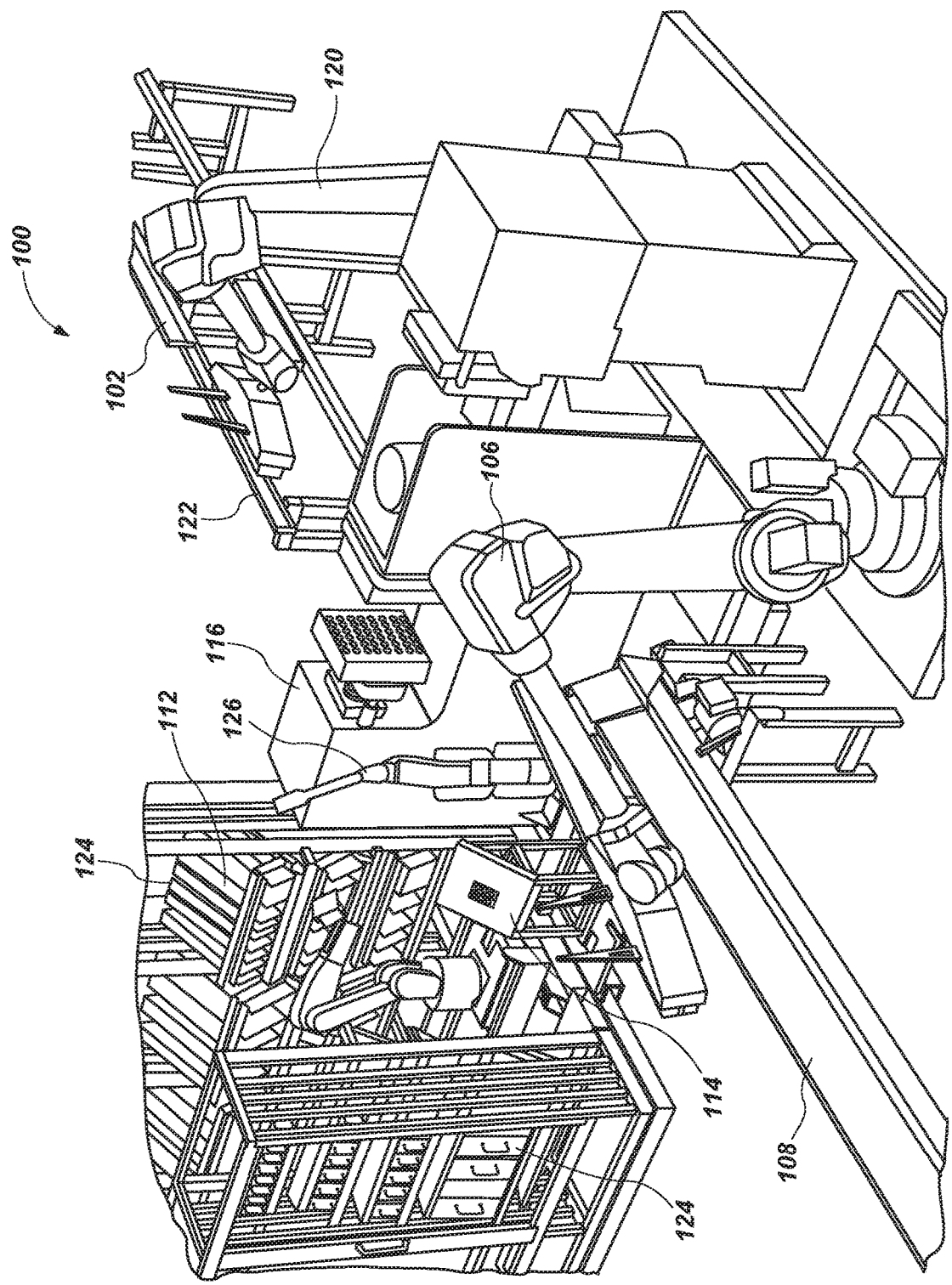
FIG. 14 is a perspective view of the pre-plating system carrying the structural member away from the pre-plating system.

FIG. 14 illustrates the outfeed delivery system 122 carrying the structural member 102 away from the pre-plating system 100. The outfeed delivery system 122 may transport the now pre-plated structural member 102 to an assembly system (e.g., an assembly table on which a structural component may be assembled by joining multiple structural members.

Figure 15:
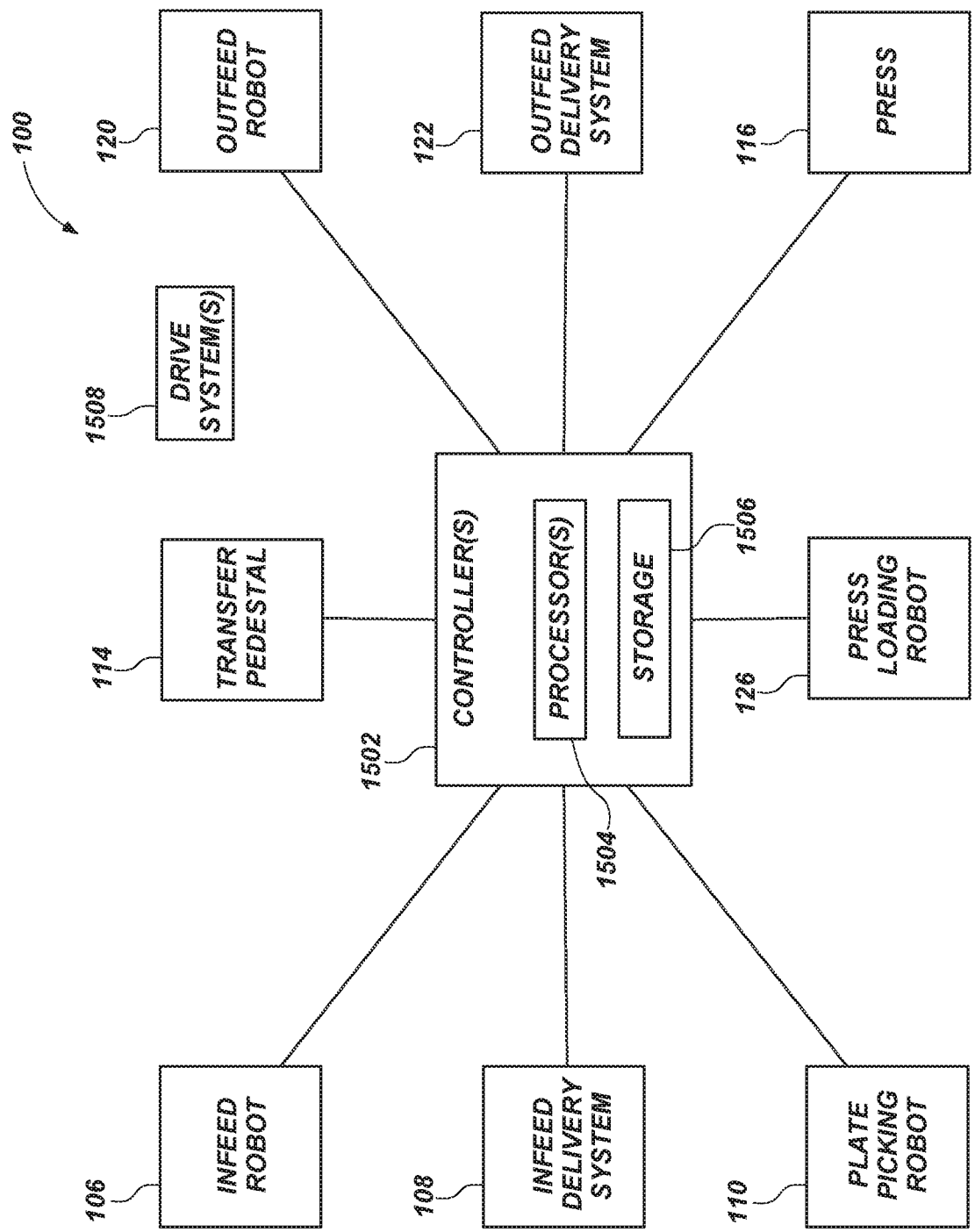
FIG. 15 is a block diagram of a pre-plating system, according to some embodiments.

FIG. 15 is a block diagram of the pre-plating system 100 of FIG. 1, according to some embodiments. The pre-plating system 100 includes the infeed robot 106, the infeed delivery system 108, the plate picking robot 110, the transfer pedestal 114, the press 116, the outfeed robot 120, the outfeed delivery system 122, and the press loading robot 126, as discussed above. The pre-plating system 100 also includes at least one controller 1502 and one or more drive systems 1508. The controller 1502 may include a central processing unit (CPU), a microcontroller, a programmable logic controller (PLC), a field programmable gate array (FPGA), other programmable device, or combinations thereof. The controller 1502 is configured to control one or more aspect of operation of one or more of the infeed robot 106, the infeed delivery system 108, the plate picking robot 110, the transfer pedestal 114, the press 116, the outfeed robot 120, the outfeed delivery system 122, and the press loading robot 126, or the drive systems 1508 according to embodiments discussed above. For example, the controller 1502 may be configured to at least partially control motion of one or more of the infeed robot 106, the plate picking robot 110, the press loading robot 126, or the outfeed robot 120. Also, the controller 1502 may be configured to at least partially control the infeed delivery system 108 and/or the outfeed delivery system 122. The controller 1502 may, in some embodiments, be configured to control electromagnets of the transfer pedestal 114 and/or the press 116. The controller 1502 may also be configured to control the press 116.

In some embodiments, the controller 1502 includes one or more processors 1504 and one or more data storage devices 1506 (hereinafter referred to as "storage" 1506). The storage 1506 may include nonvolatile storage (e.g., Flash memory, a hard disc drive, a solid state drive, etc.), volatile storage (e.g., random access memory (RAM), etc.) or combinations thereof. The storage 1506 may, in some embodiments, include computer-readable instructions stored thereon. The computer-readable instructions are configured to instruct the processors 1504 to perform control the infeed robot 106, the infeed delivery system 108, the plate picking robot 110, the transfer pedestal 114, the press 116, the outfeed robot 120, the outfeed delivery system 122, or the press loading robot 126 according to one or more operations discussed above.

The storage 1506 may also be configured to store information that is useful for operating the pre-plating system 100. For example, the storage 1506 may be configured to store information relating to geometries and/or positions of various components of the pre-plating system 100 to enable the controller 1502 to determine a position of a centroid of the structural member 102, a position of a center of a plate 602, a location of the press 116, and other such information.

The drive systems 1508 are configured to drive mechanical motion or other operation of one or more of the infeed robot 106, the infeed delivery system 108, the plate picking robot 110 the transfer pedestal 114, the press 116, the outfeed robot 120, the outfeed delivery system 122, or the press loading robot 126 according to embodiments discussed above. For example, the drive systems 1508 may include an electrical drive system, a pneumatic drive system, a hydraulic drive system, a combustion engine system, other drive systems, or combinations thereof. In some embodiments the controller 1502 may be configured to control the drive systems 1508.

Figure 16:
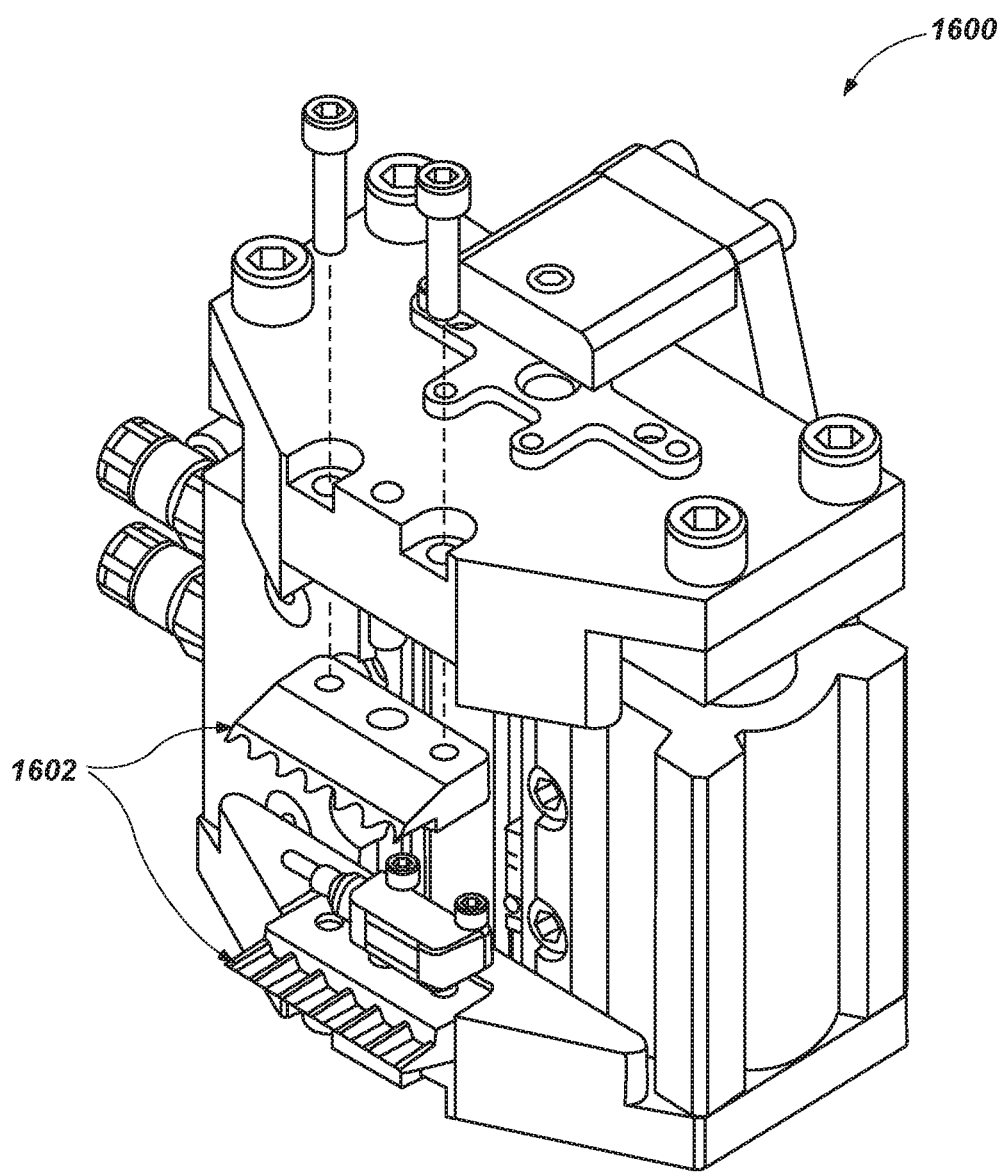
FIG. 16 is a partially exploded perspective view of a universal gripper, according to some embodiments.

FIG. 16 is a partially exploded perspective view of a universal gripper 1600, according to some embodiments. The universal gripper 1600 is configured to grip teeth of a plate using a set of gripper fingers 1602 that are designed to match a pattern of teeth on a given plate. The gripper fingers 1602 may be interchanged with other gripper finger sets that match the patterns of different plates having different teeth patterns. For example, different manufacturers of plates may use different teeth patterns. As a result, the universal gripper 1600 may be configured to grip any plate having any teeth pattern using interchangeable gripper fingers (e.g., the gripper fingers 1602). As a specific, non-limiting example, the gripper fingers 1602 of FIG. 16 were designed to match plates with a teeth pattern including oscillating positions of the teeth on the plates and based on the assumption that the tooth in the top left corner of a gripper coverage area (gripper coverage area 1802 from FIG. 18) is always in the high position relative to the row it is in. An example of such a plate is discussed below with reference to FIG. 18.

Figure 17:
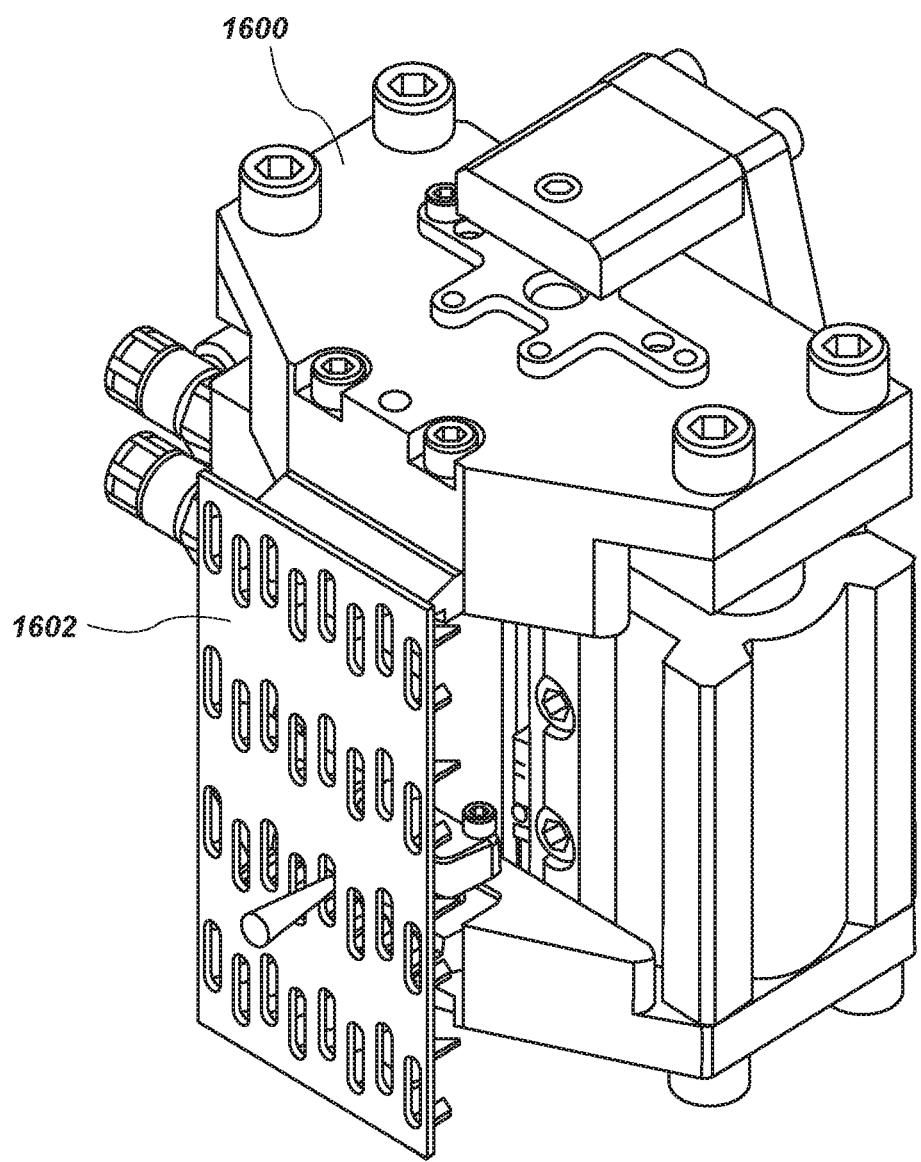
FIG. 17 is a perspective view of an example of the universal gripper of FIG. 16 gripping a plate, according to some embodiments.

FIG. 17 is a perspective view of an example of the universal gripper 1600 of FIG. 16 gripping a plate 1800, according to some embodiments. The universal gripper 1600 may use compressed air to actuate a cylinder to close around the gripper fingers 1602 of the nail plate. A sensor detects if a nail plate is present and, if it is, the sensor may also detect that the nail plate is in a correct position. In some embodiments, the sensor may also detect an orientation (e.g., direction of nails) of a nail plate. Upon the gripper fingers 1602 closing around the nail plate, another sensor may detect that the nail plate was engaged and/or that the nail plate was slid up out of the fixture.

Figure 18:
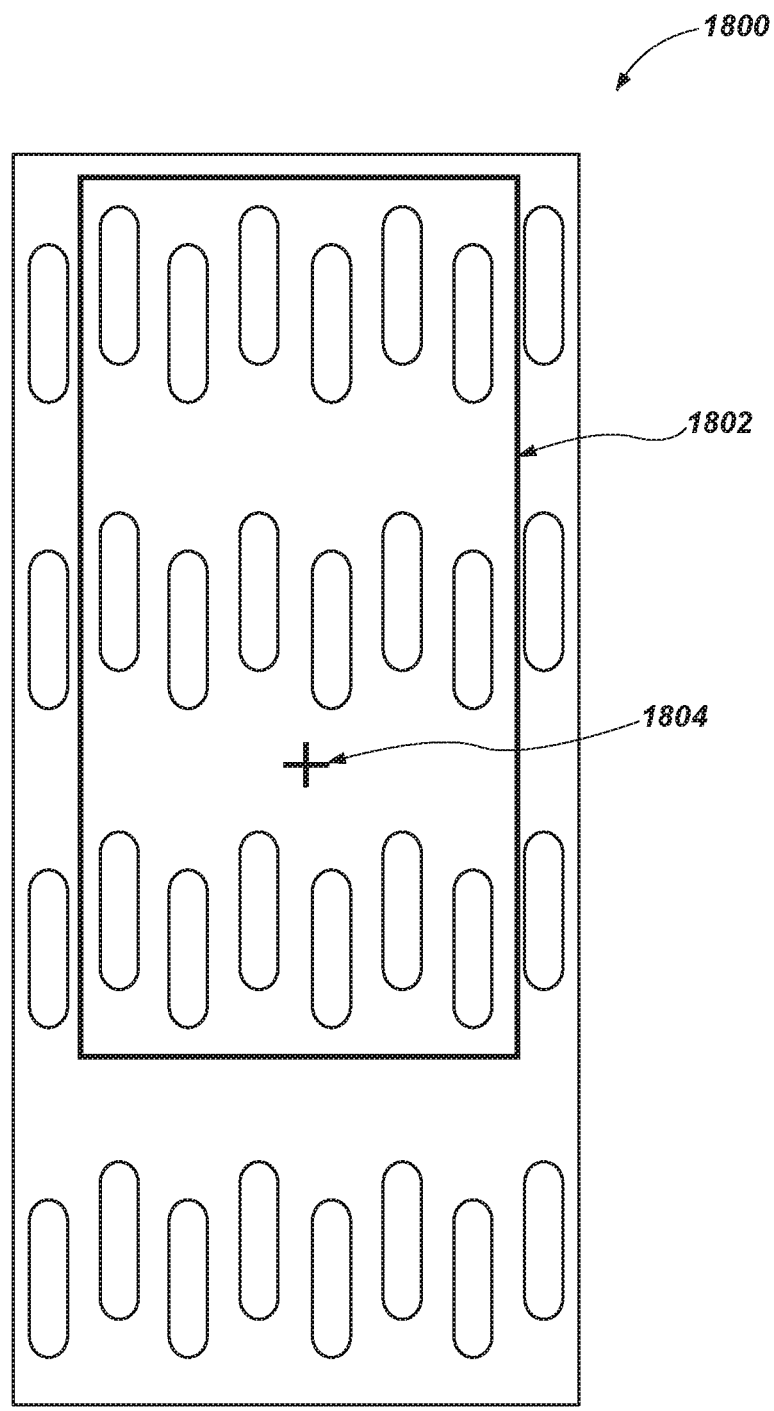
FIG. 18 is a front view of an example of a plate, according to some embodiments.
Figure 19A:
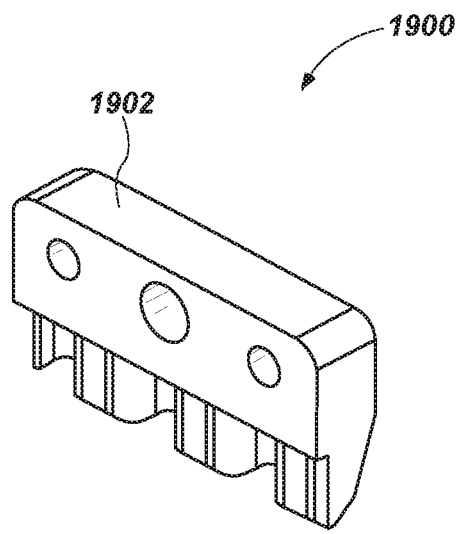
FIGS. 19A-19D illustrate example gripper fingers that may be used by the universal gripper of FIG. 16.
Figure 19B:
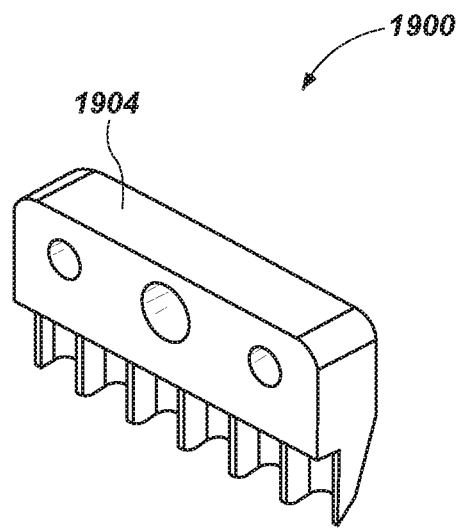
Figure 19C:
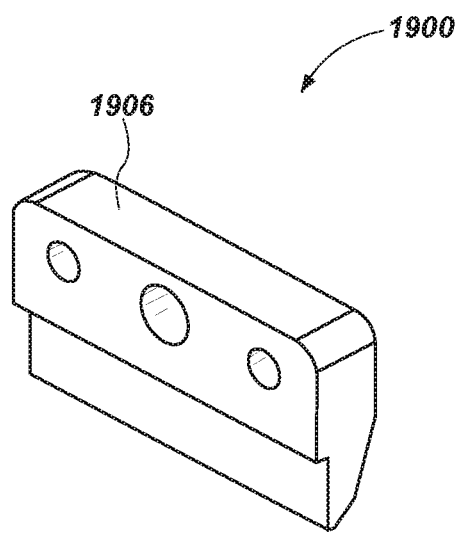
Figure 19D:
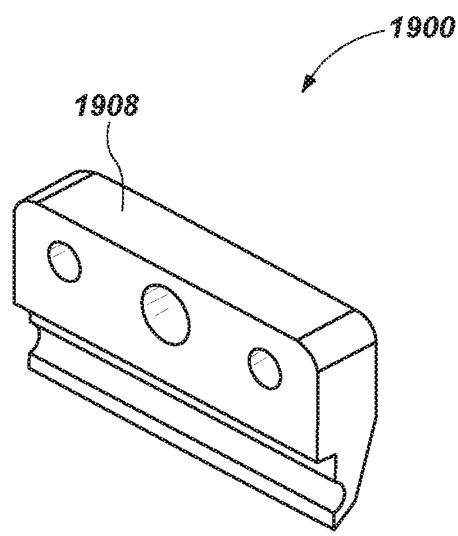

FIG. 18 is a front view of an example of a plate 1800, according to some embodiments. The plate 1800 of FIG. 18 includes a teeth pattern of rows of holes/teeth, each row having oscillating positions of holes/teeth. A gripper coverage area 1802 and a center 1804 of the plate 1800 are also shown in FIG. 18. In some embodiments, the universal gripper 1600 may position itself according to the gripper coverage area 1802 based on the center 1804 of the plate 1800.

FIGS. 19A-19D illustrate example gripper fingers 1900 that may be used by the universal gripper 1600 of FIG. 16. The example gripper fingers 1900 include an oscillating gripper finger 1902, a constant depth gripper finger 1904, a flat gripper finger 1906, and a flat notch gripper finger 1908. The oscillating gripper finger 1902 is similar to the gripper fingers 1602 discussed above with reference to FIG. 16. As previously discussed, the oscillating gripper finger 1902 was designed to match plates with a teeth pattern including oscillating positions of the teeth on the plates and based on the assumption that the tooth in the top left corner of a gripper coverage area (gripper coverage area 1802 from FIG. 18) is always in the high position relative to the row it is in. The assumption that the tooth in the top left corner of the gripper coverage area, however, is not always true. As a result, the constant depth gripper finger 1904 may be used regardless of whether the tooth in the top left corner of the gripper coverage area is in the high position or low position relative to the row it is in. The flat gripper finger 1906 and the flat notch gripper finger 1908 are other examples of gripper fingers that may be used by the universal gripper 1600.

It will be apparent to those having ordinary skill that many embodiments, though not expressly discussed herein, may exist that fall within the scope of the present disclosure.

What is claimed is:

1. A pre-plating system, comprising:
    a press;
    an infeed robot configured to deliver a structural member to the press;
    an outfeed robot configured to remove the structural member from the press;
    a transfer pedestal;
    a plate picking robot configured to retrieve a plate on the transfer pedestal; and
    a press loading robot configured to transfer the plate to the press,
    wherein the press is configured to secure the plate to the structural member while the structural member is held in position by at least one of the infeed robot or the outfeed robot.

2. The pre-plating system of claim 1, wherein the at least one of the infeed robot or the outfeed robot is configured to position the structural member within the press based on one of an end of the structural member or a determined centroid of the structural member.

3. The pre-plating system of claim 2, wherein the at least one of the infeed robot or the outfeed robot is configured to position the structural member within the press without the use of an indicia provided on or in the structural member.

4. The pre-plating system of claim 2, wherein the one of the end or the centroid is determined based on a known geometry of an infeed delivery system configured to deliver the structural member to the infeed robot and a known geometry of the structural member.

5. The pre-plating system of claim 1, wherein the press is configured to secure the plate on a press surface of the press while the at least one of the infeed robot or the outfeed robot positions the structural member within the press.

6. The pre-plating system of claim 5, wherein the press includes a securement mechanism configured to secure the plate on the press surface.

7. The pre-plating system of claim 1, further comprising an infeed delivery system configured to deliver the structural member to the infeed robot.

8. The pre-plating system of claim 1, further comprising an outfeed delivery system configured to deliver the structural member having the plate secured thereto from the outfeed robot.

9. The pre-plating system of claim 1, wherein at least one of the infeed robot or the outfeed robot includes both a suction mechanism and a gripping mechanism, wherein the at least one of the infeed robot or the outfeed robot is configured to secure the structural member with:
the suction mechanism if the structural member is longer than a predetermined threshold length, and
the gripping mechanism if the structural member is shorter than the predetermined threshold length.

10. A method of pre-plating a structural member, the method comprising:
delivering a structural member to an infeed robot;
picking a plate from a container;
delivering the plate to a transfer pedestal;
providing the plate to a press, wherein providing the plate to the press comprises transferring the plate from the transfer pedestal to the press;
positioning the structural member within the press based on one of an end of the structural member or a centroid of the structural member; and
pressing the plate into the structural member.

11. The method of claim 10, further comprising securing the plate to the transfer pedestal using a magnet.

12. The method of claim 10, wherein picking the plate from a container and delivering the plate to a transfer pedestal comprises picking and delivering the plate using a picking robot.

13. The method of claim 10, wherein transferring the plate from the transfer pedestal to the press comprises transferring the plate from the transfer pedestal to the press with a press loading robot.

14. A pre-plating system, comprising:
a press;
a transfer pedestal;
a plate picking robot configured to pick a plate from a container and position the plate on the transfer pedestal;
a press loading robot configured to transfer the plate to the press, wherein the press is configured to press the plate into a structural member positioned within the press.

15. The pre-plating system of claim 14, wherein the plate picking robot is configured to secure the plate at a center of the plate.

16. The pre-plating system of claim 15, wherein the plate picking robot is configured to locate the center of the plate based on a known location of the container and a known position of the center of the plate relative to the container.

17. The pre-plating system of claim 15, wherein the plate picking robot is configured to rotate the plate to place the plate at a desired orientation on the transfer pedestal.

18. The pre-plating system of claim 14, wherein the plate picking robot includes a gripping mechanism at an end thereof to grip the plate.

19. The pre-plating system of claim 14, wherein the plate picking robot includes a magnet at an end thereof to couple to the plate.

20. The pre-plating system of claim 14, wherein the press loading robot includes a magnet at an end thereof to couple to the plate.

21. The pre-plating system of claim 20, wherein the end of the press loading robot is configured to decouple the press loading robot from the plate upon positioning the plate on the press.

22. A pre-plating system, comprising:
a press;
an infeed robot configured to secure a structural member and position the structural member within the press;
an infeed delivery system to deliver the structural member to the infeed robot;
a transfer pedestal;
a plate picking robot configured to retrieve a plate and place the plate on the transfer pedestal;
a press loading robot configured to transfer the plate from the transfer pedestal to a press surface of the press, the press configured to press the plate into the structural member;
an outfeed delivery system configured to carry the structural member from the pre-plating system; and
an outfeed robot configured to receive the structural member from the infeed robot and deliver the structural member carrying the plate to the outfeed delivery system.

23. The pre-plating system of claim 22, wherein the infeed delivery system comprises a conveyer system.

24. The pre-plating system of claim 22, wherein the infeed robot and the outfeed robot include, at their ends, at least one of a suction mechanism to suction to the structural member or a gripping mechanism to clamp to the structural member.

25. The pre-plating system of claim 22, wherein at least one of the infeed robot or the outfeed robot is configured to reposition the structural member within the press to enable the press to press at least one other plate into the structural member.

26. A method of operating a pre-plating system, the method comprising:
delivering a structural member to an infeed robot with an infeed delivery system;
securing the structural member with the infeed robot;
placing a plate on a transfer pedestal with a plate picking robot;
positioning the structural member within the press with the infeed robot;
transferring the plate from the transfer pedestal to a press surface of the press;
pressing the plate into the structural member with the press;
transferring the structural member from the infeed robot to an outfeed robot;
delivering the structural member carrying the plate to an outfeed delivery system configured to carry the structural member from the pre-plating system.

27. The method of claim 26, wherein delivering a structural member to an infeed robot with an infeed delivery system comprises conveying the structural member to the infeed robot with a conveyer system.

28. The method of claim 26, wherein securing the structural member with the infeed robot comprises suctioning the structural member to the infeed robot with a vacuum system or gripping the structural member with a gripping mechanism.

29. The method of claim 26, further comprising repositioning the structural member within the press with the infeed robot and pressing one or more other plates into the structural member.

30. The method of claim 26, further comprising repositioning the structural member within the press with the outfeed robot and pressing one or more other plates into the structural member.

* * * * *